United States Patent

[11] 3,592,281

| [72] | Inventors | Robert C. Utter;<br>Howard W. Christenson, both of Indianapolis, Ind. |
|---|---|---|
| [21] | Appl. No. | 834,097 |
| [22] | Filed | June 17, 1969 |
| [45] | Patented | July 13, 1971 |
| [73] | Assignee | General Motors Corporation<br>Detroit, Mich. |

[54] HYDROMECHANICAL TRANSMISSION CONTROL
12 Claims, 6 Drawing Figs.

[52] U.S. Cl. .................................................. 180/6.48,
60/19, 74/720.5
[51] Int. Cl. .................................................. B62d 11/04
[50] Field of Search .......................................... 180/6.48,
6.7, 6.44; 74/720.5; 60/19

[56] References Cited
UNITED STATES PATENTS

| 3,161,245 | 12/1964 | Thoma | 180/6.48 |
|---|---|---|---|
| 3,349,860 | 10/1967 | Ross | 180/6.44 |
| 3,442,153 | 5/1969 | Ross | 60/19 |
| 3,477,225 | 11/1969 | Cryder et al. | 60/19 |

*Primary Examiner*—Benjamin Hersh
*Assistant Examiner*—John A. Pekar
*Attorneys*—E. W. Christen, A. M. Heiter and D. F. Scherer ABSTRACT: A control for an engine-driven dual-output hydromechanical transmission having hydraulic pumps and motors operative in conjunction with mechanical gearing to drive each output wherein the hydraulic ratio between the pumps and motors is controlled automatically to produce forward and reverse drive and manually to produce steer by driving. The automatic control includes a differential gearing arrangement and is responsive to engine parameters to change the hydraulic ratios of the hydraulic pumps and motors equally in the same direction while the manual control which also includes differential gearing is operative to change the hydraulic ratios equally in opposite directions thus providing steer by driving. The control also provides a hydraulic circuit and control valving to establish and maintain the neutral position of the hydraulic pumps and motors on operator demand without the aid of a mechanical stop.

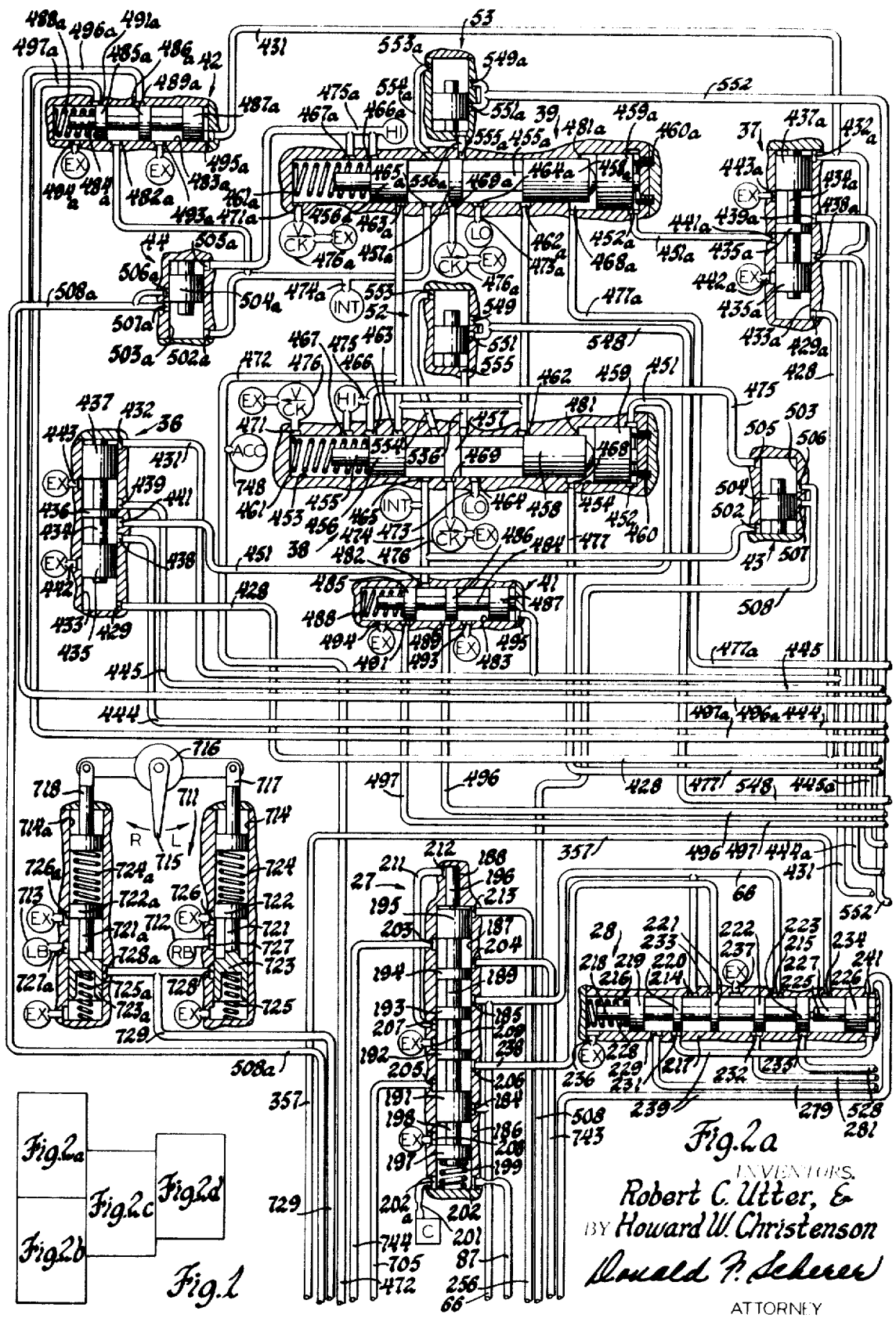

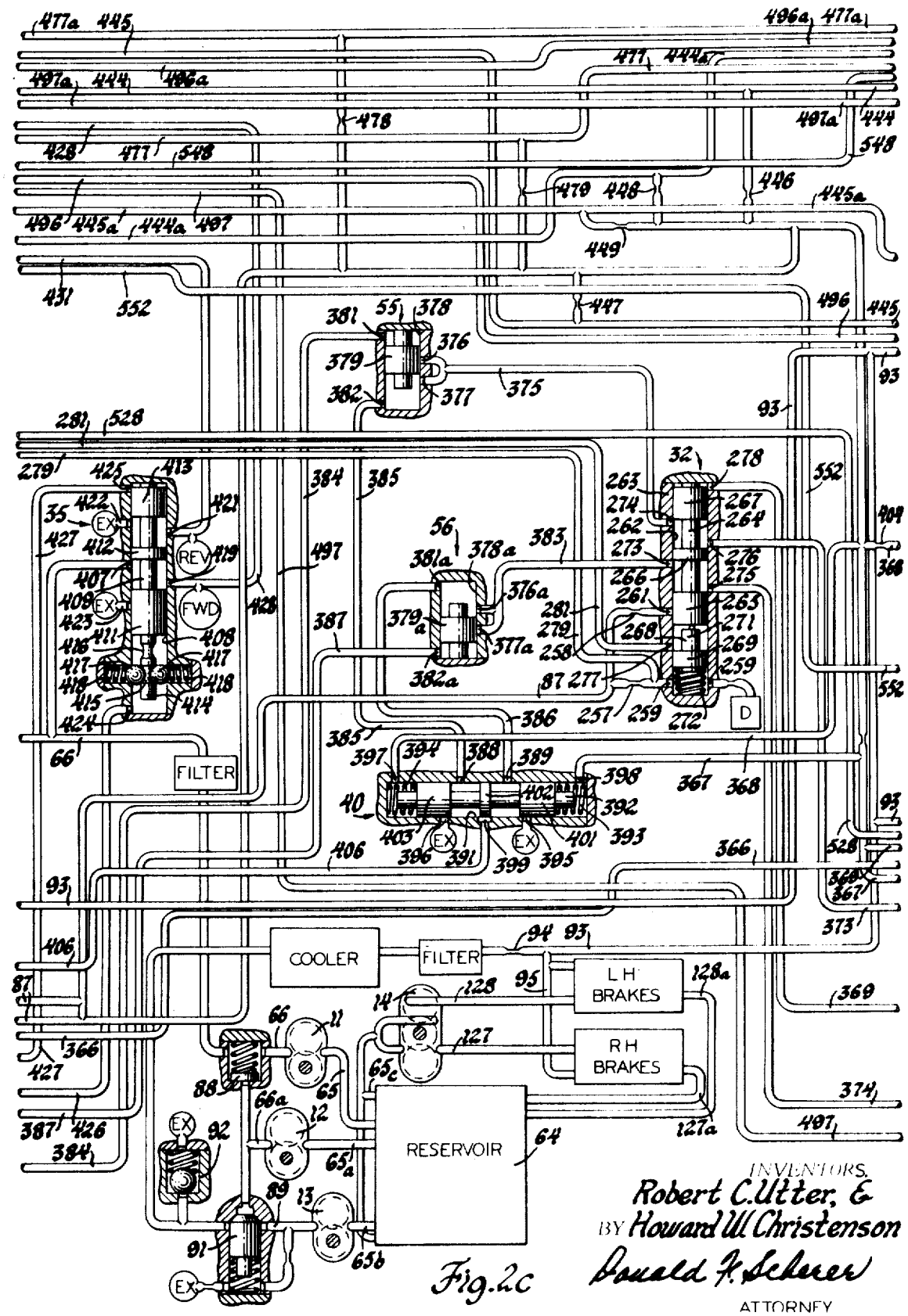

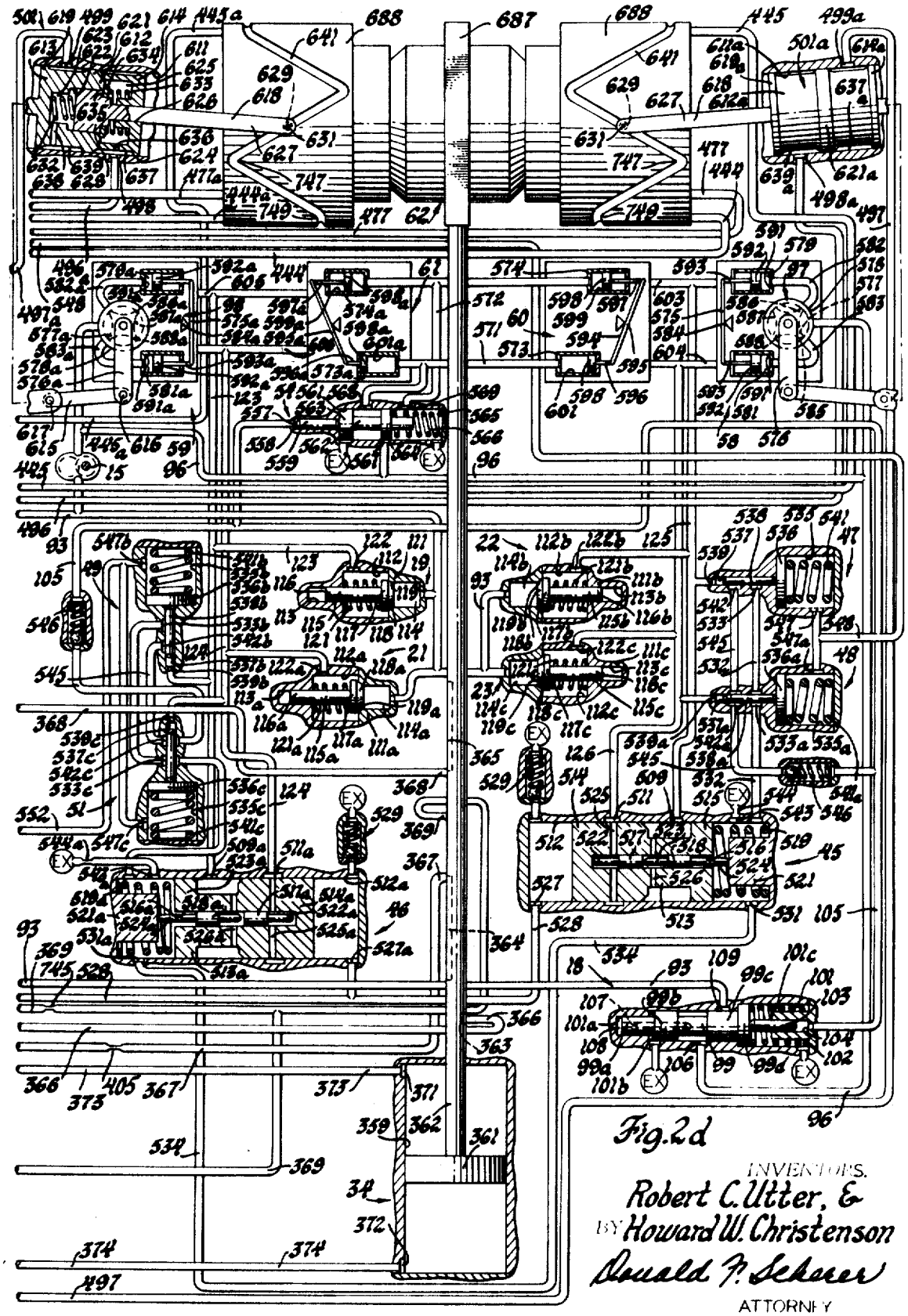

HYDROMECHANICAL TRANSMISSION CONTROL

This invention relates to hydromechanical transmission controls and more particularly to controls for a hydromechanical transmission which provides both drive and steering operation.

The disclosed control system is particularly adaptable for use with a hydromechanical transmission such as that shown in Ser. No. 502,863 Tuck et al., filed Oct. 23, 1965, now abandoned, and in Ser. No. 671,464 to Tuck, filed Sept. 28, 1967 which is a continuation of Ser. No. 502,863 and in Ser. No. 707,633 to Mooney et al., filed Feb. 23, 1968, now U.S. Pat. No. 3,426,621 which is a division of Ser. No. 671,464. The transmissions in the above-mentioned serial numbers include a hydrostatic drive for the low range of operation and hydromechanical drive for the higher ranges of operation. The present invention provides controls for these types of transmissions in which the ratio of the hydraulic units is controlled to provide the hydrostatic drive ratio and the engagement and disengagement of friction establishing devices is controlled to provide the mechanical drive ratio of the transmission. The displacement of the hydraulic units must not only be controlled to provide forward and reverse drive, but it must also be controlled to provide a steering function. The steering function is achieved by changing the displacement of the hydraulic units in opposite direction thus imparting a speed differential between the outputs. A ratio control actuator and a drive and steer differential control are utilized in the present invention to control the displacement of the hydraulic units. The differential control includes a pair of planetary gear sets which respond to movement of the ratio control actuator to provide equal output rotation of the differential control and a differential gear system which responds to a manual steer input to provide equal and opposite output of the differential control.

The ratio control actuator includes the motor comprised of the piston and cylinder and a piston rod which engages the differential control. The ratio actuator responds to pressure signals which are generated by a ratio governor and respond to engine parameters such as throttle position and speed. The ratio control actuator moves in response to the signals to cause an increase or decrease in the hydraulic ratio through the action of the differential control. It is also essential in controls for these types of transmissions to provide a positive neutral when no drive is desired. The instant invention utilized a hydraulic neutral center hold as opposed to prior devices which provide a mechanical stop for the neutral position. The neutral hold circuit receives a signal from the ratio governor and by means of a pair of valves directs the pressure signal from the ratio governor to either the forward or reverse return side of the ratio control actuator so that the actuator is always moved towards the neutral position whenever neutral operation has been selected by the operator.

The differential control also provides shift signals for the shift valves which control the engagement and disengagement of the friction drive establishing devices used with the mechanical portion of the transmission. The shift signals are generated in fluid passages which terminate at cam surfaces which are located on the differential control. When the end of the passage is closed by the cam surface, a shift signal is present and when the passage is opened, a shift signal is not present.

In many hydromechanical transmissions as those in the above-mentioned serial numbers, a pressure reversal occurs in the hydrostatic system and a ratio change is made from low range to intermediate or high range. The pressure reversal occurs because the hydraulic motor which is the driving force in the low range becomes a rotating reaction member in the intermediate range. Thus the pressure port of the hydraulic motor becomes a discharge port and vice versa, due to the fact that the gearing attempts to overrun the motor. To compensate for this pressure reversal and the efficiency change that occurs therewith, hydraulic links are interposed between the differential control and the servocontrols for the pumps. The hydraulic link receives the pressure signal from the shift valve system such that the hydraulic link is caused to expand or contract depending on the direction of motion to produce a slight change in the pump displacement to compensate for the change in efficiency which occurs in the hydrostatic system. The ratio control actuator, as mentioned above, responds to pressure signals from the ratio control governor. The ratio control governor provides an advance or a return signal depending on the throttle and engine governor forces which are opposed on the valve of the ratio control governor. The advance and return signals are distributed to the system valving and directed to the ratio control actuator. A forward-reverse directional valve directs the pressure signals to the proper side of the piston in the ratio control actuator depending on the direction of operation selected by the operator. However, when the operator selects neutral operation, a neutral hold and neutral shuttle valve are operative in the system such that any signal given by the ratio control governor is directed to the ratio control actuator as a return signal. Thus if the ratio control actuator attempts to move in a forward direction, any signal generated by the ratio control governor is seen as a return signal and moves the ratio control actuator to neutral. If the ratio control actuator should attempt to move in a reverse direction, any ratio control governor signal moves the actuator back toward neutral. Thus a hydraulic neutral hold is accomplished.

It is therefore an object of this invention to provide in an improved hydromechanical transmission control a ratio and steer differential control mechanism for providing an infinitely variable drive ratio change mechanism responsive to engine throttle setting and speed and an infinitely variable steer ratio change mechanism responsive to a manual steer signal.

Another object of this invention is to provide in an improved hydromechanical control a ratio control actuator and neutral holding valve means for providing hydraulic neutral centering of the hydrostatic drive portion of the transmission.

Another object of this invention is to provide a ratio and steer differential control for a hydromechanical transmission wherein said differential control has a pair of inputs, a pair of outputs, planetary gearing operatively connected between one input and the outputs and differential gearing operatively connected between the other input and the outputs to provide equal output movement in response to one input movement and opposite output movement in response to the other input movement.

A further object of this invention is to provide a control for a hydromechanical transmission having hydrostatic units operable at times to provide a drive and at other times to provide a reaction, said control including a ratio control mechanism for controlling the ratio of the hydrostatic units and a hydraulic yield link between the ratio control and the hydrostatic units for providing automatic compensation in the hydraulic ratio when the hydraulic units change from drive to reaction.

Yet another object of this invention is to provide for a hydromechanical transmission a ratio control mechanism having an output member operable in conjunction with a displacement control mechanism to control the hydrostatic drive ratio and operable in conjunction with shift valve means to control the mechanical drive ratio.

These and other objects and advantages of the present invention will become more apparent from the following description and drawings in which:

FIG. 1 is a block diagram showing the arrangement of FIGS. 2a, 2b, 2c, and 2d,

FIGS. 2a, 2b, 2c and 2d are schematic drawings of separate portions of the control system.

Figure 2B:
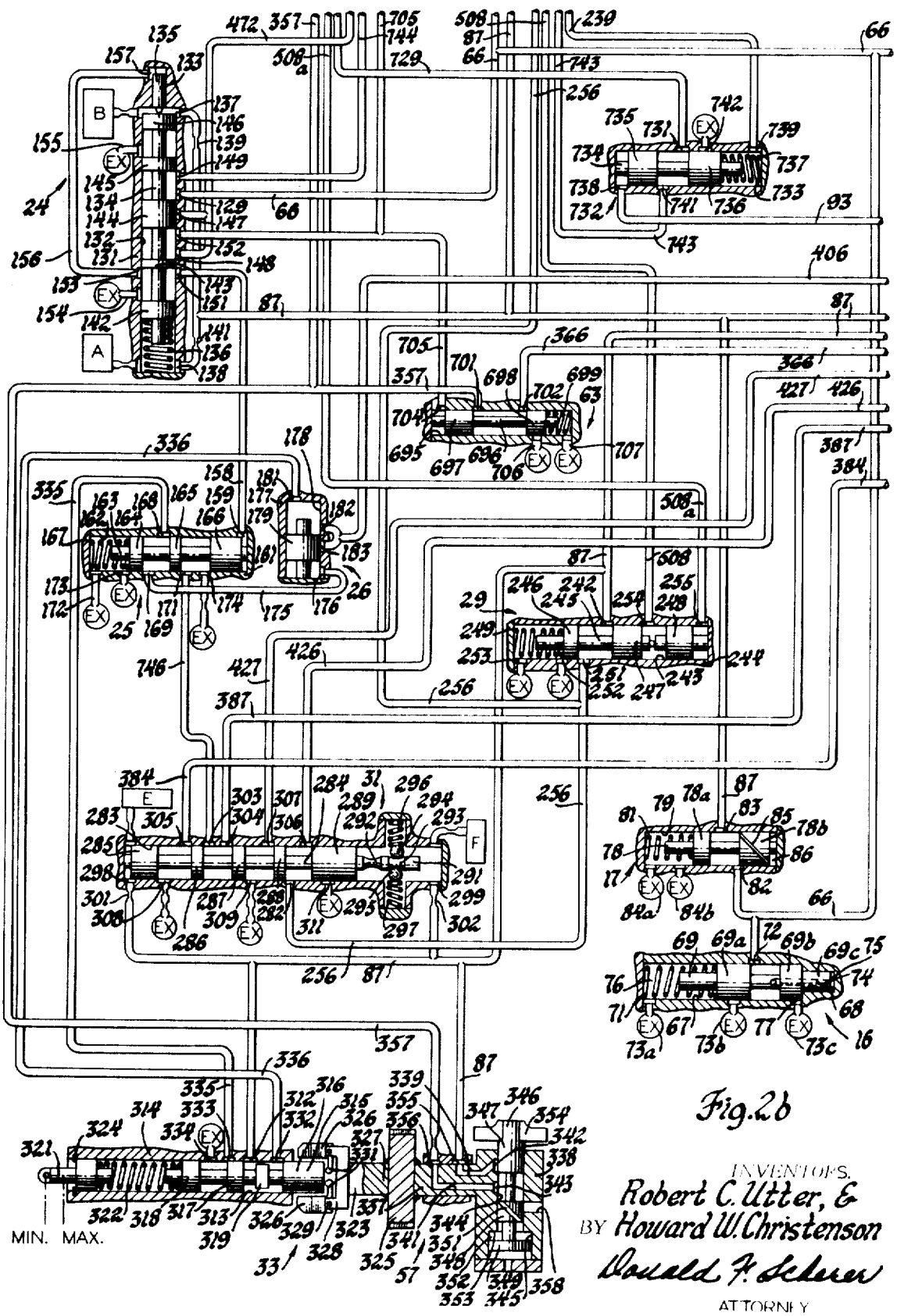

Referring to the drawings and particularly FIGS. 2a, 2b and 2c, there is shown a hydraulic control system which may be used with a hydromechanical transmission, in which the combination of a hydraulic drive and a mechanical gearing is used to extend the drive range normally associated with a hydrostatic transmission. The control system has fluid pressure and cooling components including a main pump 11, a rear pump 12, a charging pump 13, a cooling pump 14, a control pump 15, a main pressure regulator valve 16, a low-pressure regulator valve 17, the control pump pressure regulator valve 18 and four hydrostatic charging valves 19, 21, 22 and 23; drive-conditioning components including a neutral-automatic valve 24, a neutral hold valve 25, a neutral shuttle valve 26, the pivot steer valve 27, a push-start inhibitor valve 28, a shift inhibitor valve 29, a forward-reverse shift valve 31, and a push-start valve 32; and drive-establishing components including a ratio control governor 33, a ratio control motor or actuator 34, a forward-reverse clutch valve 35, right and left relay valves 36 and 37, right and left range shift valves 38 and 39, a directional valve 40, right and left intermediate signal valves 41 and 42, right and left signal shuttle valves 43 and 44, right and left bypass and relief valves 45 and 46, right relief and sensing valves 47 and 48, left relief and sensing valves 49 and 51, right and left relief control shuttle valves 52 and 53, a motor stroke control valve 54, two forward and reverse signal shuttle valves 55 and 56, an engage governor 57, right and left servo-controlled hydrostatic pumps 58 and 59, right and left hydrostatic motors 60 and 61, a ratio and steer differential control 62, and a pivot steer engage valve 63.

FLUID PRESSURE AND CONTROL COMPONENTS

The main pump 11 is driven by the vehicle engine so that it draws fluid from a reservoir 64 through a passage 65 and delivers fluid via main pressure passage 66 to the main pressure regulator valve 16 and the low-pressure regulator valve 17. The main pressure regulator valve 16 includes the large diameter bore 67, a small diameter bore 68, the valve spool 69 which has two large lands 69a and 69b and a small land 69c which are slidably disposed in the large diameter 67 and small diameter 68 respectively, a spring 71 held in compression between one end of the large bore 67 and land 69a and inlet port 72 and three exhaust ports 73a, 73b and 73c. The inlet port 72 is in fluid communication with the main pressure passage 66 and admits fluid to the large diameter bore 67 between lands 69a and 69b. A central passage 74 in the valve spool 69 directs the fluid from the inlet port 72 to a chamber 75 formed between the end of land 69c and the small diameter bore 68. The pressure of the fluid in chamber 75 pushes or forces the valve spool 69 to move to the left against the spring 71 so that exhaust port 73b is opened to the space between lands 69a and 69b thereby permitting excess fluid to be exhausted so that the proper pressure level is maintained in the main pressure passage 66. The exhaust passages 73a and 73c communicate with chambers 76 and 77 respectively to prevent any pressure buildup, due to leakage, to occur in these chambers which would affect the operation of the main regulator valve 16.

The low-pressure regulator valve 17 includes valve spool 78 having two equal diameter lands 78a and 78b, slidably disposed in a valve bore 79, a spring 81 held in compression between one end of the valve bore 79 and land 78a, an inlet port 82, a discharge port 83, two exhaust ports 84a and 84b, a diagonal-circumferential passage 85 on land 78b communicates the space between lands 78a and 78b with a chamber 86 formed by the land 78b in the right end of valve bore 79 so that when fluid is admitted from main pressure passage 66 through inlet port 82, it flows between the lands 78a and 78b and through the circumferential passage 85 to the chamber 86 to force the valve spool 78 against the spring 81 to permit land 78b to partially close the inlet port 82 thereby establishing a predetermined pressure at the discharge port 83 and the low-pressure regulator passage 87 connected thereto. The exhaust ports 84a and 84b prevent pressure buildup at the location of spring 81 and exhaust port 84b is opened to the space between lands 78a and 78b in discharge port 83 in the event that the pressure in passage 87 becomes excessive.

The rear pump 12 is driven by the output of the transmission and is, therefore, functional only when the vehicle is in motion. When the vehicle is in motion and the rear pump is operating, fluid is drawn from the reservoir 64 through the inlet passage 65a and is delivered by the rear pump 12 to passage 66a which is connected through check valve 88 to the main pressure passage 66, and to the charging circuit via check valve 89. The charging pump 13 is an engine-driven pump which draws fluid from the reservoir 64 through inlet passage 65b and then delivers it via passage 89 around check valve 91, through a cooler and a filter to a charge passage 93 which is connected to the left and right charge valves 19, 21, 22 and 23. The charge passage 93 is also connected via an orifice 94 to lube passage 95 which provides lubricating fluid for the mechanical components of the transmission. The charge passage 93 is also connected to the inlet by the control pump 15, which is an engine-driven pump, the output of which is connected to control passage 96 so that control pressure fluid is delivered to servomechanisms 97 and 98 of the hydrostatic pumps 58 and 59 respectively, to the control pump pressure regulator valve 18 and to the motor stroke control valve 54. The maximum pressure available in the charging circuit is established by a ball check valve 92.

The servocontrol pressure regulator valve 18 includes a valve spool 99 having a small diameter land 99a, two equal diameter lands 99b and 99c and a large diameter land 99d slidably disposed in a stepped diameter valve bore 101 with three different size diameters 101a, 101b, and 101c which cooperate with the land in valve spool 99, a spring 102 held in compression between land 99d and the end of bore 101c which pushes the valve spool toward the left along with pin member 103, slidably mounted in a bore 104 which is connected to high-pressure passage 105. The function of the pin member 103 is to cause the servocontrol regulator valve to regulate at a pressure proportional to the pressure of the hydraulic drive system which will be more fully explained later. The fluid in control passage 96 enters the servocontrol regulator valve 18 via inlet port 106 between lands 99b and 99c to a central passage 107 in valve spool 99 which connects to a chamber 108 between the end of land 99a and bore 101a to push the valve to move to the right against the biasing force of the spring 102 and the pin 103 until discharge port 109 is opened by land 99c to permit excess fluid in the control passage 96 to flow into charge passage 93 thereby maintaining a predetermined pressure to control passage 96.

The charging valves 19, 21, 22 and 23 are identical in construction so that a description of one will suffice for all. The description will be given for valve 19. All of the corresponding components of charging valves 21, 22 and 23 will be given a, b, and c suffixes respectively. Valve 19 includes a valve body 111 having a large bore 112, a small bore 113, and an inlet chamber 114 which is in communication with the charge passage 93. A poppet 115 has a stem 116 slidably disposed in bore 113 and an expanded head 117 with a tapered edge 118. The tapered edge 118 is designed to seat in a tapered portion 119 between chamber 114 and bore 112 when the valve is in the closed position to prevent communication between bore 112 and chamber 114. A spring 121 is held in compression between the bottom of bore 112 and the expanded head 117 to insure closing of the valve. An outlet port 122 is in communication with bore 112 operatively connected to a makeup and relief passage 123 which is part of the hydrostatic drive system to be described later. The makeup and relief passage 123 may carry either high or low-pressure fluids depending on the operation of the hydrostatic drive system. When the pressure in the makeup and relief passage 123 is high, it aids the spring 121 to maintain the valve 19 closed, but when the pressure in passage 123 is low, the pressure of the charging fluid in passage 93 will cause the valve 19 to open thereby permitting makeup fluid to enter the hydrostatic drive system to compensate for leakage losses. The outlet ports 122a, 122b, 122c of their corresponding valves are connected to makeup and relief passages 124, 125 and 126 respectively.

The cooling pump 14 is an engine-driven double pump which supplies two cooling circuits in the transmission. It has an inlet 65c and two outlets 127 and 128. The passage 127 supplies cooling fluid to the right-hand brakes while the passage 128 supplies cooling fluid to the left-hand brakes. The cooling fluid flows through the transmission housing around the components and then returns to the reservoir via passages 127a and 128a.

DRIVE CONDITIONING COMPONENTS

The main pressure passage 66 is connected to the port 129 of the neutral-automatic valve 24. The neutral-automatic valve 24 further includes a valve body 131 having a main bore 132, a small bore 133, a valve spool 134 slidably disposed in the bore 132, a plug valve 135 slidably disposed in bore 133 and a return spring 136 held in compression between the bottom of bore 132 and the valve spool 134 to force the valve spool upward against the plug valve 135. The neutral-automatic valve has two control ports, 137 at its upper end and 138 at its lower end, which are in fluid communication with the low-pressure regulator passage 87 via control orifices 139 and 141 respectively. The ports 137 and 138 direct low-pressure regulator fluid to either end of the valve spool 134 and to control solenoids B and A respectively. The valve spool 134 has a plurality of lands 142, 143, 144, 145 and 146, spaced along its length which lands provide for selective communication between a plurality of ports, which are in fluid communication with the valve bore 132, including range apply ports 147, 148, a neutral main port 149, a neutral hold port 151, a pivot steer port 152, an automatic hold port 153, and two exhaust ports 154 and 155. The port 153 is connected to an automatic hold passage 156 which directs fluid to a port 157 at the upper end of bore 133 and the plug valve 135. The solenoids A and B are electrically operated such that when solenoid B is operated, the upper end of valve spool 134 is vented through exhaust and the orifice 139 is operative to restrict the flow of low-pressure regulator fluid into port 137 such that the low-pressure regulator fluid at port 138, operating on the lower end of valve spool 134 and the spring 136 maintain the valve spool in the position shown, which is the neutral position. When the solenoid A is operated, the lower end of the valve spool 134 is vented so that the control orifice 141 is operative to restrict the flow of low-pressure regulator fluid through port 138 while the low-pressure regulator fluid available at port 137 operates on the upper end of valve spool 134 to urge the valve downward against the force of spring 136 and places the valve in the automatic position. The port 151 of the neutral-automatic valve 24 is in fluid communication via passage 158 with a port 159 of the neutral hold valve 25.

The neutral hold valve 25 includes a valve body 161 having a bore 162 and a valve spool 163 having a plurality of land 164, 165, and 166 slidably disposed in the valve bore 162. A spring member 167 abuts the lower end of the valve bore 162 and the valve spool 163 diverts the valve spool upward in the bore so that it contacts the upper end of valve bore 162. The valve spool 163 is slidable in the bore 162 to control the flow of fluid between a plurality of ports including an advance inlet port 168, a neutral return port 169, an advance outlet port 171, and a plurality of exhaust ports 172, 173 and 174. The neutral return port 169 is connected via neutral return passage 175 352 a neutral return port 176 of the neutral shuttle valve 26 which includes a valve body 177 having a valve bore 178 and a shuttle valve spool 179 slidably disposed in the valve bore 178. Shuttle valve spool 179 is movable within the bore 178 to provide selective communication between a plurality of ports including the neutral return port 176, a return inlet port 181, and two return outlet ports 182 and 183.

The main pressure passage 66 is also connected to the pivot steer valve 27 via ports 184 and 185. The pivot steer valve further includes a valve body 186 having a large bore 187, a small bore 188, a valve spool 189, having equal diameter lands 191, 192, 193, 194, and 195 slidably disposed in the bore 187, a plug valve 196 slidably disposed in the bore 188, a single-land plug valve 197 having a stem portion 198 and being slidably disposed in valve bore 187 such that the stem 198 abuts the valve spool 189 and a return spring 199 held in compression between the end of bore 187 and the plug valve 197. The low-pressure regulator passage 87 is in fluid communication with the pivot steer valve 27 via orifice 201 and port 202 at the lower end thereof which is also in fluid communication with a solenoid valve C via port 202a. A plurality of ports including ports 184 and 185, a neutral main inlet port 203, a neutral main outlet port 204, a pivot steer clutch apply port 205, a pivot steer exhaust port 206, a pivot steer hold port 207 and exhaust ports 208 and 209 which are in fluid communication with the bore 187 and may be selectively interconnected by movement of the valve spool 189. The port 207 is connected via passage 211 to a port 212 which is in communication with the small bore 188 and the upper end of plug valve 196. A signal port 213 communicates fluid to the upper end of valve spool 189 to provide a shift signal for the valve when a pivot steer mode is selected. The solenoid C is electrically operated, such that when the solenoid is actuated, the fluid at the lower end of the plug valve 197 is exhausted so that a pressure signal at port 213 will cause the valve spool 189 to move downward to the pivot steer position. The restriction 201 controls the flow of fluid from low-pressure regulator passage 87 to prevent a buildup of pressure at the lower end of plug valve 197 so that the pressure at the upper end of valve spool 189 will hold the valve in the shifted position.

The main pressure passage 66 is also connected to the push-start inhibit valve 28 via ports 214 and 215 which are in communication with a bore 216 in a valve body 217. The push-start inhibit valve 28 further includes a valve spool 218 having a plurality of lands 219, 220, 221, 222 and 223 slidably disposed in the valve bore 216, a plug valve 225 having a single land 226, slidably disposed in the valve bore 216, and a stem 227 which abuts the upper end of valve spool 218, and a return spring 228 held in compression between the lower end of valve bore 216 and the land 219 of spool 218. The push-start inhibit valve 28 also has a plurality of ports in communication with the valve bore 216, including the ports 214 and 215, a push-start signal port 229, a push-start inhibit port 231, a push-start blocking port 232, a pivot steer exhaust port 233, an engaged inlet port 234, an engaged outlet port 235 and two exhaust ports 236 and 237. The pivot steer exhaust port 233 is in fluid communication with the port 206 with the pivot steer valve 27 via passage 238. The push-start inhibit port 231 is in communication with an annular port 241 at the upper end of plug valve 225 via passage 239.

The low-pressure regulator passage 84 is in fluid communication with port 242 of the inhibitor valve 29. Inhibitor valve 29 further includes a valve bore 243, a valve body 244, a valve spool 245 having lands 246 and 247 slidably disposed in bore 243, a plug valve 248 positioned between the upper end of valve spool 245 and the upper end of bore 243, and a spring 249 held in compression between the lower end of bore 243 and land 246 of valve spool 245. The inhibitor valve 29 also has a plurality of ports including an inhibited main port 251, two exhaust ports 252 and 253, a right signal port 254, and a left signal port 255 which ports are in fluid communication with the valve bore 243. The right-hand signal port 254 permits signal fluid to operate on the upper end of valve spool 245 to force it downward against the spring 249 while the left signal port 255 permits signal fluid to act on the upper end of plug valve 248 to force both the plug valve 248 and the valve spool 245 downward against the spring. When the inhibitor valve 29 is in the position shown, the port 242 is open to the port 251 between the lands 246 and 247 to permit low-pressure regulator fluid to pass from port 242 to port 251 which is connected to an inhibitor main pressure passage 256 and when the valve spool 245 is shifted downward under the influence of the signal at either port 254 or 255, the inhibited main port 251 is connected to exhaust port 252 while the port 242 is closed by land 247.

The low-pressure regulator passage 87 is connected to the push-start valve 32 through restrictions 257 and 258 and ports 259 and 261 respectively. The push-start valve 32 further includes a valve bore 262, a valve body 263, a valve spool 264 in a valve body 263, a valve spool 264 having lands, 265, 266 and 267 slidably disposed in bore 262, a plug valve 268 having a single land 269 slidably disposed in valve bore 262 and a reduced diameter stem member 271 which abuts the lower end of valve spool 264, and a spring member 272 compressed between the land 269 and the lower end of valve bore 262 thereby forcing the plug valve 268 and the valve spool 264 upward in the valve bore 262. The push-start valve 32 has a plurality of ports including a forward advance inlet port 273, a reverse advance inlet port 274, a forward advance outlet port 275, a reverse advance outlet port 276, a push-start blocking port 277 and a push-start signal port 278. The port 259 is annular in shape and besides being in communication with orifice 257, it is also in communication with solenoid D, which is electrically operated, to provide an operation similar to that described for solenoid A, B and C. A passage 279 is connected between port 229 of the push-start inhibit valve 28 and downstream of restriction 257 at port 259 of the push-start valve 32 so that when low-pressure regulator fluid is available downstream of 257, such as when solenoid D is not operating, that pressure is reflected through passage 279 to port 229 of the push-start inhibit valve 28. With the push-start valve 32 in the unshifted position, as shown, the forward advance inlet and outlet ports 273 and 275 are in fluid communication between lands 265 and 266 while the reverse advance inlet and outlet ports 274 and 276 are in fluid communication between lands 266 and 267. When the valve spool 264 is in the downshifted position, low regulator pressure at port 261 is directed to the forward advance outlet port 275. Port 277 is connected to the valve bore 262 between the land 265 of the valve spool 264 and land 269 of plug valve 268 and via push-start blocking passage 281 to the push-start blocking port 232 of the push-start inhibit valve 28.

The inhibitor main passage 256 is connected between ports 251 of the inhibitor valve 29 and a port 282 of the forward-reverse shift valve 31. The forward-reverse shift valve further includes a valve bore 283 and a valve spool 284 having lands 285, 286, 287, 288, and 289 slidably disposed in the valve bore 283 and a stem portion 291 having two annular grooves 292 and 293 which are formed to receive balls 294 and 295 which are held in the grooves by spring members 296 and 297 respectively. The action of the balls and springs provide a detent hold for the forward-reverse shift valve 31. The forward-reverse shift valve 31 also has forward and reverse annular signal ports 298 and 299 respectively which provide fluid communication from low-pressure regulator passage 87 through restrictions 301 and 302 respectively to shift solenoids E and F respectively. The forward-reverse shift valve 31 also includes advance port 303, forward advance port 304, a reverse advance port 305, forward-inhibited main port 306, reverse-inhibited main port 307 and a plurality of exhaust ports 308, 309, and 311. The solenoids E and F operate, as described above, for the other solenoids to permit the valve to be shifted from forward to reverse and vice versa so that the advance port 303 is connected to the forward advance port 304 in the forward position as shown. The inhibit port 282 is connected to the forward-inhibited main port 302 in the forward position as shown while the reverse advance port 304 and the reverse-inhibited main port 307 are connected to exhaust.

DRIVE ESTABLISHING COMPONENTS

The low-pressure regulator passage 87 is connected via a port 312 to the ratio control valve 33 which includes a valve bore 313 in a valve body 314, a valve spool 315 slidably disposed in bore 313 and having three equal diameter lands 316, 317 and 318 and a small diameter land 319 between lands 316 and 317, a throttle link 321, a spring 322 held in compression between the throttle link 321 and the valve spool 315. The throttle link 321 is movable by the operator between minimum and maximum positions to vary the force imposed by the spring 322 on the valve spool 315. The minimum position is established by a snapring 324, held in a groove in the bore 313, so that leftward movement of the throttle link is limited thereby. The ratio governor 323 includes a gear 325 driven by an engine output shaft or transmission input shaft, not shown, and two centrifugal flyweights 326 driven with the gear 325 through a shaft 327 integral with or otherwise secured to the gear 325 and a hub 328 secured to the shaft 327. The flyweights 326 are rotatably mounted on the hub 328 by pins 329. As the speed of gear 325 increases, the flyweight 326, due to centrifugal force, rotates perpendicular to the gear 325 on the pin 329 so that a force proportional to input speed is applied to the valve spool 315 through levers 331 which are secured to, and extend inwardly from, the flyweights 326. Thus, as input speed increases, the valve spool 315 is urged to the left while as throttle force increases, the valve spool 315 is urged to the right, the result being that the position of the valve spool 315 in the bore 313 is determined by the combination of governor and throttle forces. As the valve spool is moved in the bore 313, it controls the flow of low-pressure regulator fluid between supply port 312 and a return port 332 or an advance port 333. Fluid communication between the advance port 333 and an exhaust port 334 is also controlled by the valve spool 315. The advance and return port 333 and 332 are connected via an advance passage 335 and a return passage 336 to port 168 of the neutral hold valve 25 and the port 181 of the neutral shuttle valve 26 respectively.

The engaged governor 57 is also driven by the gear 325 through a shaft 337 which is integral with or otherwise secured to a valve body 338. The engaged governor valve 57 further includes an inlet passage 339 and an outlet passage 341 in the shaft 338 which are in communication with an inlet port 342 and an outlet port 343 respectively, and a valve spool 346 having two equal diameter lands 347 and 348 slidably disposed in a small valve bore 344 of valve body 338 and a large diameter land 349 slidably disposed in a large bore 345 of valve body 338. The land 348 has a circumferential diagonal passage 351 which communicates pressure fluid from the recessed area between lands 347 and 348 to a control chamber 352 formed between the valve land 349 and a shoulder 353 between bores 344 and 345, a weight member 354 is secured to the valve spool 346 so that upon rotation of the engaged governor valve 57, a centrifugal force is generated to force the valve spool 346 to move out of the valve bore 344 thereby opening the port 342 to the area between lands 347 and 348. The low-pressure regulator passage 87 is connected to inlet passage 339 of the engaged governor valve 57 via port 355 so that low regulator pressure fluid is admitted to the area between lands 347 and 348 when port 342 is open. The fluid pressure between lands 347 and 348 is communicated to the chamber 352 via passage 351, as described above, so that the fluid pressure in chamber 352 acts on the land 349 due to the differential area between bores 344 and 345 thereby urging the valve spool 346 to move inward so that valve land 347 closes the port 342. Thus, the pressure of the fluid between lands 347 and 348 is proportional to the speed of gear 325. The fluid between lands 347 and 348 is communicated via port 343 and outlet passage 341 to a port 356 which is connected to an engage passage 357. With the pressure of the fluid between lands 347 and 348 becoming higher than its predetermined proportion to the speed of gear 325, such as when the gear 325 decreases in speed, the valve spool 346 will move further inward in bore 344 to permit the opening of an exhaust passage 358 to the area between lands 347 and 348 so that the pressure in the port 353 and the engage passage 357 will be reduced.

The ratio control actuator 34 includes a cylinder bore 359, a piston 361 slidably disposed in the cylinder bore 359 and a piston rod secured to the piston 361 and extending through the end of cylinder bore 359 to the ratio and steer differential control 62. The piston rod 362 is generally cylindrical in shape and has, spaced along its periphery, an engage exhaust recessed groove 363, a reverse exhaust recessed groove 364 and a forward exhaust recessed groove 365. These recessed grooves provide exhaust connections for an engage exhaust passage 366, a reverse signal passage 367 and a forward signal passage 368 respectively which are mounted immediately adjacent the periphery of the piston rod 362. The reverse recessed area 364 provides an exhaust communication for a push-start passage 369 during push-start operation as will be more fully explained later. Movement of the piston 361 and piston rod 362, upward and downward within the cylinder bore 359, is controlled by pressure fluid delivered to the cylinder bore at its upper end through a port 371 and its lower end through a port 372. The ports 371 and 372 are connected to a reverse advance passage 373 and a forward advance passage 374 respectively. The passages 373 and 374, in turn, are connected to ports 276 and 275 respectively and through the push-start valve 32, as explained above, to ports 274 and 273 respectively. The port 274 is connected via passage 375 to outlet ports 376 and 377 of the forward and reverse signal shuttle valve 55. The signal shuttle valve 55 includes the valve bore 378, a spool 379 slidably disposed in the valve bore 378, a reverse advance port 381 communicating with the upper end of valve bore 378 and a forward return port 382 communicating with the lower end of valve bore 378. The port 273 is connected via passage 383 to ports 376a and 377a of the signal shuttle valve 56. The signal shuttle valve 56 is identical in construction with the signal shuttle valve 55, therefore, the corresponding components of signal valve 56 are given the same numerical designation with an a suffix so that the above description of signal valve 55 is deemed sufficient. The ports 381 and 382 of valve 55 are connected to a reverse advance passage 384 and a forward return passage 385 respectively while the ports 381a and 382a of the valve 56 are connected to a reverse return passage 386 and a forward advance passage 387 respectively.

The forward return passage 385 and reverse return passage 386 are connected to ports 388 and 389 respectively of a directional valve 40. The directional valve 40 also includes a valve bore 391, a valve spool 392 slidably disposed in the valve bore 391, two spring members 393 and 394, two exhaust ports 395 and 396, a forward signal port 397, a reverse signal port 398 and a return inlet port 399. The spring 393 and 394 provide a resilient centering force for the valve spool 392 in the valve bore 391. The valve spool 392 has three equal diameter lands 401, 402 and 403 spaced along its length which provide selective communication between the various ports of the directional valve 40 as follows. When no signal or equal signals are present at either the forward signal port 397 or the reverse signal port 398, fluid pressure at port 399 is distributed to both the forward return passage 385 and the reverse return passage 386 since the land 402 does not have sufficient width to completely close port 399, while both exhaust ports 395 and 396 are closed by lands 401 and 403 respectively. When the forward signal is present at port 397 and, therefore, the upper end of valve spool 392, the valve spool is moved downward so that port 399 is open to the forward return passage 385 between lands 402 and 403 while the reverse return passage 386 is open to exhaust 395 between lands 402 and 401. When a reverse signal is present at port 398, the valve spool 392 is moved upward against spring 394 so that port 399 is open to the reverse return passage 386 between lands 401 and 402 while the forward return passage 385 is opened to exhaust between lands 402 and 403. The forward and reverse signal ports 397 and 398 are connected to the forward and reverse signal passages 368 and 367 respectively which, in turn, are connected to the low-pressure regulator passage 87 via restrictions 404 and 405 respectively. Thus, it is obvious that the position of the directional valve 40 is determined by the opening and closing of the forward and reverse signal passages 368 and 367 by the piston rod 362. The return port 399 is connected via passage 406 to the return ports 182 and 183 of the neutral shuttle valve 26.

The main pressure passage 66 is connected to a port 407 of the forward-reverse clutch valve 35. The forward-reverse clutch valve further includes a valve bore 408, a valve spool 409 slidably mounted in the valve bore 408 and having three equal diameter lands 411, 412 and 413 and a detent stem 414 having two detent grooves 415 and 416 and a ball detent mechanism including a plurality of balls 417 which are resiliently positioned in the groove 415 or 416 by spring members 418. The forward-reverse clutch valve 35 also has a forward clutch port 419, a reverse clutch port 421, two exhaust ports 422 and 423, a forward signal port 424, and a reverse signal port 425. The forward and reverse signal ports 424 and 425 are connected via forward inhibit main passage 426 and reverse inhibit main passage 427 respectively to forward inhibit main port 306 and reverse inhibit main port 407 respectively of the forward-reverse valve 31. Thus, it is apparent that shifting of the forward-reverse clutch valve 35 is controlled by movement of the forward-reverse valve 31. The forward-reverse valve 31 moves when the shift selector is moved. However, the forward-reverse clutch valve 35 does not move until inhibit conditions are met, i.e. power train must be in low range on both sides, so that fluid pressure is available in the inhibitor main pressure passage 265 to shift the clutch valve 35. The forward clutch port 419 is connected via forward clutch passage 428 to the forward clutch FWD of the transmission and two ports 429 and 429a of the right and left relay valves 36 and 37 respectively. The reverse clutch port 421 is connected via passage 431 to the reverse clutch REV of the transmission and to ports 432 and 432a of the right and left relay valves 36 and 37 respectively.

The right and left relay valves 36 and 37 are identical in construction so that a description of one will suffice for both. The description will be given of the right relay valve 36 and the corresponding components of the left relay valve 37 will be given the same numerical designation with an a suffix. The right relay valve 36 includes a valve bore 433, a valve spool 434 having equal diameter lands 435, 436 and 437 slidably disposed in the bore 433, a right intermediate forward port 438, a right intermediate reverse port 439, a right intermediate signal port 441, and two exhaust ports 442 and 443. The right intermediate forward and reverse ports 438 and 439 are connected to right intermediate forward and reverse passages 444 and 445 respectively and the left intermediate forward and reverse ports 438a and 439a are connected to left intermediate forward and reverse passages 444a and 445a. The passages 444, 445, 444a and 445a are connected via orifice restrictions 446, 447, 448 and 449 respectively to the low-pressure regulator passage 87. The passages 444, 445, 444a and 445a terminate in close special relationship with cam surfaces on the ratio and steer differential control 62. The function of the cam surfaces is to provide either the presence or absence of signal pressure in these passages in relation to the rotational position of the ratio and steer differential control. This will be described in more complete detail later. The right intermediate port 441 and the left intermediate port 441a are connected via passages 451 and 451a to signal ports 452 and 452a respectively of the right and left range shift valves 38 and 39 respectively. Thus, when the forward-reverse clutch valve 35 is in the position shown; that is, the forward position, the passage 428 receives pressure fluid through the forward-reverse clutch valve 35 from main pressure passage 66 and directs the fluid to the ports 429 and 429a of the right and left relay valves 36 and 37 to move the valve spools 434 and 434a upward in their respective valve bores so that when signal pressure fluid is available in passages 444 and 444a, it will be directed by the relay valves 36 and 37 to ports 452 and 452a of the range shift valves 38 and 39. When the forward-reverse clutch valve 35 is shifted to a reverse position, passage 431 receives fluid through the valve 35 and directs it to ports 432 and 432a of the relay valves to move them downward so that signal pressure fluid, when available in passages 445 and 445a will be directed through the relay valves 36 and 37 to ports 452 and 452a of the right and left range shift valves 38 and 39.

The right and left range shift valves 38 and 39 are identical in construction so that a description for the right shift valve 38 will suffice for both. The corresponding components of the left range shift valve 39 will be given the same numerical designation with an *a* suffix. The right range shift valve 38 includes the small bore 453, a large bore 454, a valve spool 455 having three equal diameter lands 456, 457, and 458 slidably disposed in the small bore 453, a plug valve 459 slidably disposed in the large bore 454 and the spring 461 held in compression between the left end of small bore 453 and land 456 so that a force is present to push the valve spool 455 and the plug valve 459 rightward in their respective bores. There is also a light spring 460 on the right end of plug 459 to assure that the plug 459 stays to the left in high range when the pressure is equal on both sides of the plug 459. The shift valve 38 also has a plurality of ports including range apply ports 462 and 463, low apply port 464, intermediate apply port 465, a high apply port 466, a high exhaust port 467, a high shift signal port 468 and two exhaust ports 469 and 471. The range apply ports 462, 463, 462a and 463a are connected via a range apply passage 472 to range apply ports 147 and 148 of the neutral automatic valve 24. The low apply ports 464 and 464a are in fluid communication via passages 473 and 473a low range friction-drive-establishing devices LO while the intermediate ports 465 and 465a are connected via passages 474 and 474a to intermediate-friction-drive-establishing devices INT in the transmission and the high apply ports 466 and 466a are connected via passages 475 and 475a to high range friction-drive-establishing devices HI in the transmission.

The exhaust ports 469, 471, 469a and 471a are connected to exhaust or the reservoir 64 via ball check valves 476 which maintain a slight back pressure in passages 473, 474, 475, 473a, 474a, and 475a thereby keeping the passages full of fluid to reduce the engagement time required for the friction-drive-establishing devices LO, in and HI. The high signal ports 468 and 468a are connected via passages 477 and 477a to the low regulated pressure passage through restrictions 478 and 479 respectively. The passages 477 and 477a terminate at the cam surfaces on the ratio and steer differential control 62 as was described above for the right intermediate forward passage 444. The right and left shift valves 38 and 39 control the engagement and disengagement of the various friction-drive-establishing elements in the transmission. When no shift signals are present at the range shift valves, the valve spools 455 and 455a and the plug valves 459 and 459a are moved to the furthest rightward position by the springs 461 and 461a thus providing a connection from port 462 to port 464 between lands 457 and 458 to establish engagement of the low range friction-establishing device LO. When a shift signal is present at port 452, the plug valve 459 and the valve spool 455 move leftward until the plug valve abuts a shoulder 481 between the large bore 454 and the small bore 453. With the valve spool 455 in this position, the intermediate apply port 465 is open to the range apply port 463 between lands 456 and 457 while the range apply port 462 is closed by land 458 and the low apply port 464 and the high exhaust port 467 are open to exhaust port 469 and 471 respectively. When a high ratio signal is present at port 468, the valve spool 455 is moved to its most leftward position against the spring 461, by fluid pressure applied between land 458 and plug valve 459, so that the range apply port 463 is open to the high apply port 466 between lands 456 and 457 while the low apply port 464 and the intermediate apply port 465 are open to exhaust port 469 between lands 457 and 458 while the high exhaust port 467 is closed by land 456.

The intermediate range apply passages 474 and 474a are connected to ports 482 and 482a of the right and left intermediate signal valves 41 and 42 respectively. The right and left intermediate signal valves 41 and 42 are identical in construction so that a description of one will suffice for both. The right intermediate signal valve 41 will be referred to during the description and corresponding components of the left intermediate signal valve 42 will be given the same numerical designation with an *a* suffix. The right-hand signal valve 41 includes a valve bore 483, a valve spool 484 having three equal diameter lands 485, 486 and 487 slidably disposed in the valve bore 483, and a spring 488 held in compression between the left end of the valve bore 483 and land 485 to provide a biased force on the valve spool 484 to force the valve spool to the right during forward operation. The intermediate signal valve 41 also has a plurality of ports communicating with the valve bore 483 including a right intermediate forward port 489, a right intermediate reverse port 491, two exhaust ports 493 and 494 and a reverse signal port 495. The reverse signal port 495 is connected to passage 431 so that when the reverse clutch is engaged, a reverse signal is present between the right end of bore 83 and land 487 to move the valve spool 484 leftward in bore 483 and thereby establish a reverse position at the intermediate signal valve 41. When the right intermediate signal valve is in the forward position, a pressure signal is communicated from port 482 to port 489 between lands 485 and 486 while the port 491 is open to exhaust port 494 between valve land 485 and the left end of bore 483. When the right intermediate signal valve 41 is moved to reverse position, due to a reverse pressure signal at port 495, fluid communication is established from port 482 to port 491 between lands 485 and 486 while port 489 is open to exhaust port 493 between lands 486 and 487. The ports 489 and 491 are connected via passages 496 and 497 respectively to ports 498a and 499a of a right intermediate hydraulic link 501a. The ports 489a and 491a at the left intermediate signal valve 42 are connected via passages 496a and 497a to ports 498 and 499 respectively of a left intermediate hydraulic link 501.

The intermediate signal passages 474 and 474a are also connected to ports 502 and 502a respectively of the right shuttle valve 43 and the left shuttle valve 44 respectively. The right and left shuttle valves 43 and 44 are identical in construction so that a description of one will suffice. The right signal shuttle 43 will be described and the corresponding components of the left signal shuttle 44 will be given the same numerical designation with an *a* suffix. The right signal shuttle 43 includes a valve bore 503, a plug valve 504 slidably disposed in bore 503, a high signal port 505 in communication with the upper end of bore 503, the high signal output port 506, an intermediate signal output port 507 and the port 502 which is located at the lower end of bore 503. When the intermediate friction device INT is engaged, the pressure fluid in passage 474 is communicated to port 502 to shift the plug valve 504 upward in bore 503 thereby permitting fluid communication between port 502 and 507. The port 507, in turn, is connected to a right inhibit signal passage 508 which is connected to port 254 of the inhibit valve 29. When the high range friction-drive-establishing device HI is engaged, the pressure in passage 475 is communicated to port 505 thereby holding the plug valve 504 downward in the bore 503 so that fluid communication is permitted between port 505 and port 506. The port 506 is also connected to passage 508.

The makeup and relief passages 125 and 126 are connected to ports 509 and 511 respectively of the right bypass and relief valve 45 while the makeup and relief passages 123 and 124 are connected to the ports 509a and 511a of the left bypass and relief valve 46. The right and left bypass and relief valves 45 and 46 are identical in construction. Thus, a description of the right bypass and relief valve 45 will suffice for both. The corresponding components of the valve 46 will be given the same numerical designation with an *a* suffix. The right bypass and relief valve 45 has a valve bore 512, a valve spool 513 slidably disposed in the bore 512 and includes two equal diameter lands 514 and 515 and a central bore 516 closed at one end, two plug valves 517 and 518 slidably disposed in the central bore 516, a spring 519, held in compression between the land 515 and one of the bore 512, and a stop member 521 integral with one end of the bore 512 extending inside a portion of the spring 519. The plug valve 517 has a reduced diameter stem portion 522 adjacent the closed end of central bore 516 while the plug valve 518 has two reduced diameter stem portions 523 and 524. The stem portion 523 is adjacent a plug valve 517 and the stem portion 524 is adjacent the stop member 521. A radial passage 525 in land 514 intersects the central bore 516 adjacent the stem 522 and a second radial passage 526, between lands 514 and 515, intersecting the central bore 516 adjacent stem 523. An annular engage control port 527 communicates the end of bore 512 with the port 235 of the push-start inhibit valve 28 via an engage control passage 528. Thus, fluid pressure in passage 528 is applied through the engage control port 527 to the end of land 514 to urge the valve spool 513 against the force of spring 519. A ball check valve 529 is also connected at the engage control port 527 to limit the pressure of the fluid applied to the valve spool 513. When the valve spool 513 is moved to the right against spring 519, the plug valve 518 abuts the stop member 521 and the plug valve 517 while the plug valve 517 abuts the closed end of central bore 516 thus limiting the movement of the valve spool 513. When the valve spool 513 is in this position, the passage 525 is aligned with port 511 and the port 509 is in fluid communication between lands 514 and 515 with passage 526. Thus, the pressure in makeup and relief passage 126, port 511 and passage 525 is applied between the end of central bore 516 and the plug valve 517 to urge the valve spool 513 to the left. The pressure in passage 125, port 509 and passage 526 is applied between the plug valves 517 and 518 to urge the valve spool 513 to the left. Thus, it is apparent that pressure in either passage 125 or 126 tends to move the valve spool 513 to the left. When the valve spool 513 abuts the end of bore 512, the bypass and relief valve is in the open position so that free flow between ports 509 and 511 and passages 125 and 126 is obtained thereby prohibiting a pressure buildup in either passage 125 or 126. The portion of the bore 512 surrounding the stop member 521 has an annular relief port 531 in fluid communication therewith. The relief port 531 is also connected via passage 532 to a port 533 and a port 533a of the right relief and sensing valves 47 and 48 respectively and via passage 534 to the port 531a of the left bypass and relief valve 46.

The relief and sensing valves 47, 48, 49 and 51 are similar in construction and, therefore, a description of one of them; namely, valve 47 will suffice. The corresponding components of valves 48, 49 and 51 will be given a, b, and c suffixes respectively. The relief and sensing valve 47 has a large diameter bore 535 with a plug valve 536 slidably disposed therein and a small bore 537, contiguous with the large diameter bore 535 and a plug valve 538 slidably disposed in the small bore 537. A port 539 is in fluid communication with the small bore 537 and is connected to makeup and relief passage 125 so that fluid pressure in passage 125 moves the plug valve 538 until it abuts plug valve 536 which is restrained from movement by a compression spring 541 until the force applied to plug valve 538 by the fluid pressure is sufficiently large to overcome the force of spring 541. In the at rest or low-pressure position, as shown, the plug valve 538 closes the port 533 and another port 542. However, when the pressure in passage 125 is sufficient to overcome the force of spring 541, the port 542 is opened to port 539 and a further increase of pressure in passage 125 will cause the port 533 to be opened. When the port 533 is opened, the pressure fluid in passage 125 flows through port 539, port 533, passage 532 and port 531 to the bypass and relief valve 45 where it is exhausted at a controlled rate through port 543 and restriction 544. At the same time, a pressure force is generated on the end of land 515 to move the valve spool 513 leftward so that control fluid communication between ports 509 and 511 is established. With fluid communication thus established, the pressure in passage 125 will thereby be limited. The port 542 is connected via passage 545 through a ball check valve 546 to the high-pressure passage 105. As was described earlier, the high-pressure passage 105 is in fluid communication with the pin member 103 so that when the pressure of the fluid in passage 125 is sufficiently high to open the port 542, the pressure of the fluid in passage 125 is directed to passage 105, as described above, to be applied to the pin member 103 of the control pump pressure regulator valve 18. The pressure applied to pin 103 imposes an additional biasing force on the valve spool 99 so that the fluid pressure in chamber 108 and control passage 96 will increase proportionally. Thus, it is seen that the pressure level of the servocontrol fluid in passage 96 is proportional to the pressure of hydrostatic drive system which is present in the makeup and relief passages 123, 124, 125 and 126.

The relief pressure setting of the relief and sensing valves is established by the spring member 541, 541a, 541b and 541c and also by a pressure bias when either the low or intermediate friction-drive-establishing devices are engaged to obtain the pressure bias, ports 547, 547a, 547b and 547c are provided in the large diameter bores 535, 535a, 535b, and 535c of their respective relief and sensing valves. The ports 547 and 547a are connected via passage 548 to ports 549 and 551 of the right relief control shuttle valve 52 while the ports 547b and 547c are connected via passage 552 to ports 549a and 551a through the left relief control shuttle valve. The right relief control shuttle valve 52 also has a port 553 connected via passage 554 to the low range apply passage 473 and a port 555 connected via passage 556 to the intermediate range apply passage 474. The left relief control shuttle valve has a port 553a connected via passage 554a to the low range apply passage 473a and a port 555a connected via passage 556a to the intermediate apply passage 474a. The right and left relief control shuttle valve are identical in construction to the right and left signal shuttle valves 43 and 44 so that a further description of these relief control valves does not appear to be necessary. It should be appreciated that when the transmission is operating in low range, that the pressure fluid to engage low range friction-drive-establishing devices LO is also directed via passage 554, port 553, port 549 and passage 548 to the relief and sensing valves 47 and 48 thereby establishing the pressure bias on plug valve 536 which is additive to the force of spring 41 to resist the pressure in passage 125 or 126 that is applied to plug valve 538 or 538a. In the intermediate range, the pressure fluid which applies the intermediate friction-drive-establishing devices INT is also communicated to the relief and sensing valves in a similar manner to establish a pressure bias.

The passage 105 is also connected through port 557 to a small diameter bore 558 of the motor stroke control valve 54. The motor stroke control valve 54 also has a pin member 559 slidably disposed in the bore 558, a large bore 561 with a valve spool 562 having two equal diameter lands 563 and 564 slidably disposed therein, and a spring 565 held in compression in a chamber 566 between valve land 564 and one end of bore 561. A port 567 provides fluid communication from control passage 96 to the space between lands 563 and 564, while the valve lands 563 and 564 provide selective communication, depending on the position of the valve spool 562, which is responsive to fluid pressure in high-pressure passage 105, between a low stroke port 568 and a high stroke port 569 which are connected via stroke control passages 571 and 572 respectively to control motors 573 and 573a, 574 and 574a of the hydrostatic motors 60 and 61.

The hydrostatic pumps 58 and 59 are of conventional axial-piston-type construction in which a swashplate is angularly adjustable relative to the pump input shaft so that relative reciprocal movement between a cylinder barrel, which is driven by the pump input shaft, piston members, which abut the swashplate are housed in and rotate with the cylinder barrel, and is obtained to generate a positive displacement of fluid into and out of the cylinder barrel. The angular position of the swashplate relative to the input shaft determines the amount of fluid to be displaced during each revolution of the input shaft. That is, if the swashplate is perpendicular to the input shaft, no displacement occurs while at angular adjustments other than perpendicular, some positive displacement does occur. The angular movement of the swashplate which is designated 575 is controlled by servomechanisms 97 and 98. The servomechanism 97 includes an input lever 576 secured to a rotary valve member 577 which is disposed in the rotary valve body 578 and two stroke control actuators 579 and 581 which are in fluid communication with the valve body 578 via passages 582 and 583 respectively. Also connected to the valve body 78 is the control passage 96 which supplies pressure fluid to the servomechanism to operate the stroke control actuators 579 and 581. The swashplate 575 is rotatably mounted on a pintle 584 and is drivingly connected through a linkage or other suitable means to the valve body 578. The valve 577 has four axially extending valve lands 585, 586, 587 and 588 at its outer periphery which selectively control the passage of control fluid between passage 96 and passage 582 or 583 upon rotation of the input lever 576, and an exhaust port so that when either passage 582 or 583 is not open to passage 596, it is open to exhaust. The stroke control actuator 579 and 581 each have a cylinder 591 with a piston 592 slidably disposed therein and a piston rod 593 operatively connected between the piston 592 and the swashplate 575. Thus, when control fluid is admitted to either stroke control motor 579 or 581, the control fluid is applied to the piston 592 so that it moves within its cylinder bore thereby causing the swashplate 575 to rotate about its pivot 584. Rotation of the swashplate 575 is transmitted to the valve body 578 thereby causing the valve body 578 to rotate in the same direction that the valve spool 577 was rotated until the passage 582 or 583 is closed to passage 96 and the desired pump displacement is established. The hydrostatic pumps 58 and 59 and the servocontrol mechanisms 97 and 98 are identical in construction. Therefore, the above description of hydrostatic pump 58 and the servocontrol mechanism 97 is considered sufficient. The corresponding components of hydrostatic pump 59 and servocontrol mechanisms 98 will be given the same numerical designation with an a suffix.

The hydrostatic motors 60 and 61 are also of conventional axial-piston-type construction. The hydrostatic motor 60 has a swashplate 594 which is rotatably mounted on a pintle 595 and is operatively connected to the control motors 573 and 574 through piston rods 596 and 597 respectively. The stroke control motors 573 and 574 also includes a piston 598 operatively connected to their respective piston rods and slidably disposed in cylinder bores 599 and 601 which are in fluid communication with stroke control passages 571 and 572 respectively. Operation of the stroke control motors is controlled by the motor stroke control valve 54 which was described above. Thus, when the motor stroke control valve 54 is in the position shown, or the low stroke position, pressure fluid in passage 96 is admitted between lands 563 and 564 to passage 571 and cylinder bore 599 of the control motor 573. The pressure of the control fluid is at a sufficient level to maintain the piston 598 against the bottom of bore 599 thereby establishing the low motor stroke as shown. When the pressure in passage 105 rises to a predetermined level, the plug valve 559 and valve spool 562 are moved leftward in their respective bores against the spring 565 so that passage 96 is open between lands 563 and 564 to passage 572 and the control motor 574 while the passage 571 and control motor are open to exhaust. The pressure of the fluid in control motor 574 causes the piston 598 to move to the bottom at bore 601 and through piston rod 597, causing the swashplate to rotate about the pintle 595 to establish the high stroke position of the motor. This high stroke position is used when abnormally high drive resistance is encountered as determined by the pressure level in high-pressure passage 105 which in proportional to the hydrostatic drive pressure. The hydrostatic motors 60 and 61 are identical in construction, therefore, the above description of hydrostatic motor 60 is considered as being sufficient of both hydrostatic motors. Thus, the corresponding components of hydrostatic motor 61 will be given the same numerical designation with an a suffix. The hydrostatic pump 58 and the hydrostatic motor 60 are hydraulically interconnected by hydrostatic drive passages 603 and 604 which are in communication with the makeup and relief passages 125 and 126 respectively. The hydrostatic pump 59 and hydrostatic motor 61 are hydraulically interconnected via hydrostatic drive passages 605 and 606 which are connected to the makeup and relief passages 123 and 124 respectively.

The left intermediate hydraulic link 501 includes a valve bore 611 a two-piece valve spool 612 comprised of two valve members 613 and 614 which are bonded together, a servo link 615 pivotally connected to the input lever 576a and the valve member 613 by pins 616 and 617 respectively and a cam link 618. The valve member 613 has two equal diameter lands 619 and 621 slidably disposed in the valve bore 611, a piston bore 622 and a spring chamber 623. The valve member 614 has a single land 624 slidably disposed in the valve bore 611, a spring chamber 625 and a central bore 626 in which a rod portion 627 of the cam link 618 is slidably disposed. A piston member 628, formed on one end of the valve link 618 is slidably disposed in the piston bore 622 of the valve member 613. The other end of the cam link 618 has a roller bearing 629 rotationally mounted thereon by a pin 631. A spring 632 is located in the spring chamber 623 and held in compression between the end of spring chamber 623 and the piston 628. Another spring member 633 is located in spring chamber 625 and held in compression between the end of spring chamber 625 and a washer 634 which abuts the end of valve member 613 and a shoulder 635 formed on the piston 628 when the intermediate hydraulic link 501 is in position. The valve member 614 has a radial passage 636 which communicates the spring chamber 625 with a recessed portion 637 on the outer periphery of valve member 614 between lands 624 and 621. The valve member 613 has a radial passage 638 which communicates the spring chamber 623 in piston bore 622 with a recessed area 639 on the outer periphery of valve member 613 between lands 619 and 621. The recessed area 637 is in fluid communication with the left intermediate signal valve 42 via port 498, passage 496a, and intermediate forward port 489a, while the recessed area 639 is in fluid communication with the left intermediate signal valve 42 via port 499, passage 497a and intermediate reverse port 491a. Thus, when left intermediate forward signal is present at valve 42, the signal is transmitted as described above to the recessed area 637 through the radial passage 636 to the spring chamber 625 where it applies a pressure force to the valve member 614 and the differential area between piston 628 and the rod portion 627. Since the piston 628 and rod portion 627 are grounded by a cam track 641 on the ratio and steer differential control 62, the valve spool 612 will be moved rightward against the force of spring 632. The servo link 615 is moved with the valve spool 612 to produce rotational movement of the servo lever 576a which, in turn, causes a slight change in displacement of the hydrostatic pump 59. When the transmission is shifted from low range to intermediate range, a pressure reversal occurs at the hydraulic motor. This pressure reversal is accompanied by an efficiency change in the hydrostatic drive. The slight change in pump displacement caused by the hydraulic link 501 compensates for the efficiency change. When a left reverse intermediate signal is present at valve 42, it is transmitted to the spring chamber 623 and piston bore 622 to apply a pressure force to the piston 628 and the valve member 613. Since the piston member 628 is grounded by the cam track 641, the valve spool 612 will move leftward, against the force of spring 633, to produce a corresponding movement of the servocontrol 98 which thereby causes a slight change in displacement of the hydrostatic pump 59. The right intermediate hydraulic link is identical in construction and operation to the left intermediate hydraulic link 501, therefore, the above description is considered to be sufficient for both of the hydraulic units. The corresponding components of the right intermediate hydraulic link 501a will be given the same numerical designation with an a suffix.

Figure 3:
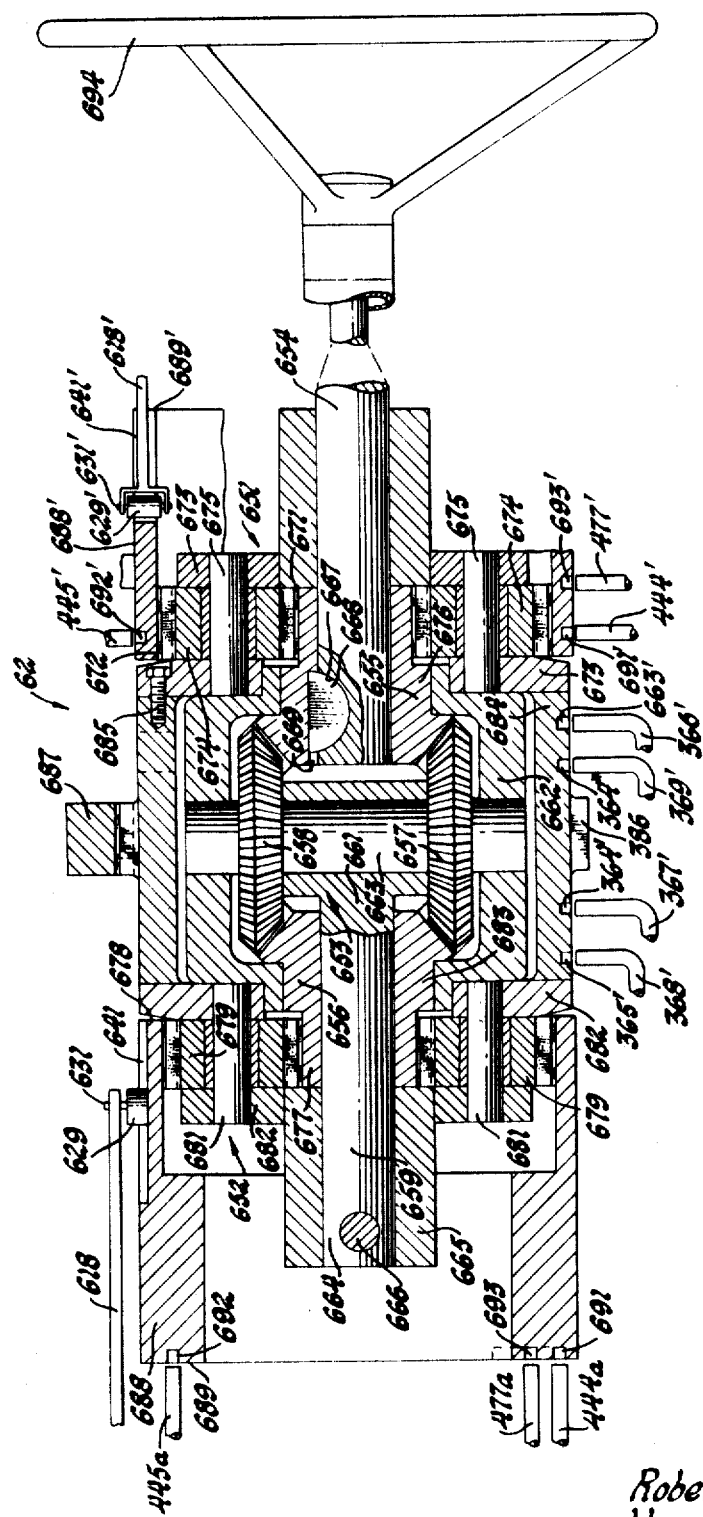
FIG. 3 is an elevational view in cross section of the ratio and steer differential control.

The ratio and steer differential control 62, shown in FIG. 3, includes a right planetary gear set 651, a left planetary gear set 652, a differential bevel gear set 653 and a steer shaft 654. The bevel gear differential 653 includes an input gear 655, an output gear 656, two reaction gears 657 and 658 which mesh with the input gear 655 and the output gear 656 and a two-piece carrier member 659 having an internal portion 661, an external portion 662 and a pin member 663 which secures the internal and external portions 661 and 662 together and rotatably supports the reaction gears 657 and 658 between the internal and external portion 661 and 662. The internal portion 661 has a shaft extension 664 which is secured to a stationary housing 665 by a pin 666. The steer shaft 654 has a semicircular groove 667 with a key 668 mounted therein which drivingly connects the steer shaft 654 to the input gear 655 through a keyway 669. The planetary gear set 651 includes a sun gear 671, a ring gear 672, a carrier member 673 having the plurality of pinions 674 rotatably mounted on pins 675 which pinions mesh with the sun gear 671 and the ring gear 672. The sun gear 671 is formed on, or otherwise secured to, a hub 676 of the input gear 655. The left planetary gear set 652 includes a sun gear 677, a ring gear 678 and a plurality of pinion gears 679 which mesh with the sun and ring gear 667 and 668 and are rotatably mounted on pins 681 which are secured to a carrier member 682. The sun gear 677 is integral with or otherwise secured to a hub portion 683 of the output gear 656. The right and left planetary gear sets 651 and 652 are interconnected by a hub member 684 which is secured to the carriers 673 and 682 by a plurality of fasteners 685. The hub 684 has an external gear 686 integral with or otherwise secured to the outer periphery of the hub 684. The external gear 686 meshes with a rack gear 687 which is secured to the piston rod 362 of the ratio control actuator 34. The ring gear 678 has a hub extension 688 with a cylindrical periphery which contains the cam track 641 for providing an operative connection between the ring gear 678 and the servocontrol 98, and an annular edge surface 689. The annular edge surface 689 has formed therein a plurality of recessed grooves 691, 692 and 693 for providing shift signal controls in the left intermediate forward and reverse passages 444a and 445a and the left intermediate high passage 477a respectively. Thus, when the recessed groove 691 is adjacent the passage 444a, the passage is opened to exhaust so that no pressure signal for the shift valve 39 is present. When the hub 687 is rotated a predetermined amount, the passage 444a will be adjacent the flat annular surface 688 instead of the groove 691 thereby preventing or sufficiently reducing the leakage of fluid from passage 444a so that a pressure signal may be developed within passage 444a to permit shifting of the left range shift valve 39.

An alternate method of construction of the ring gear and hub extension is shown in FIG. 3 at the right ring gear 672. The ring gear 672 has a hub portion 688' integral therewith or otherwise secured thereto. The hub 688' has an annular edge portion 689' with a cam track 641' formed thereon. A cam follower 629' contacts the cam track 641' and is rotatably supported on a cam link 618' by a pin 631'. The cam link 618' is connected to the intermediate hydraulic link 501a in a manner similar to that described above for cam link 618. The hub 688' or the ring gear 672 has grooves 691', 692' and 693' formed in the circumferential surface thereof which are aligned with passages 444', 445' and 447' respectively. A rotation of the ring gear 672 provides selective opening and closing of passages 444', 445' and 447' relative to the grooves 691', 692' and 693' respectively so that shift signals may be developed in these passages in a manner similar to that described above for passage 444a. Also shown, in FIG. 3, is an alternative method of construction which permits the exhaust recessed grooves 363, 364 and 365 to be placed on the hub 684 rather than the piston rod 362. Thus, the exhaust recessed grooves 363', 364' and 365' are formed in the outer periphery to provide exhaust connections for an engage exhaust passage 366', a reverse signal passage 367', and a forward signal passage 368' which are mounted immediately adjacent the outer periphery of hub 684 and circumferentially aligned with exhaust grooves 363', 364' and 365' respectively. A push-start passage 369' is also located immediately adjacent the hub 684 and is circumferentially aligned with exhaust groove 364''.

Thus the hub 684 may be rotated to provide selective communication between the recessed grooves 363', 364' and 365' and the passages 366', 367' and 368' respectively. Rotation of the hub 684 will also provide selective communication between exhaust groove 364' and the push-start passage 369'.

The ratio steer and differential control 62 will provide an equal amount of rotational movement of the ring gears 672 and 678 in the same direction or in opposite directions. To provide equal rotation of the ring gears 672 and 678 in the same direction, the steer shaft 654 is held from rotation by the operator through a steer control member 694 while the rack gear 687 is moved linearly by the ratio control actuator 34. Linear movement of the rack gear produces rotary movement of the hub 684 through the external gear 686. The carrier members 673 and 682 are rotated with the hub member 684. The bevel gear set 653 is held stationary by the steer shaft 654 and the sun gears 671 and 677 are held stationary by the bevel gears 655 and 656 respectively thereby providing reaction members for the planetary gear sets 651 and 652. Therefore, due to the planetary action of pinion gears 674 and 679, the ring gears 672 and 678 are rotated in the same direction as hub member 684. To provide equal and opposite rotation of the ring gears 672 and 678, the ratio control motor 34 and the hub member 684, drivingly connected thereto, are held stationary while the steer shaft 654 is rotated by the operator through the steer control member 694. The input gear 655 is with the steer shaft while the output gear 656 is rotated opposite to the steer shaft 654 due to the stationary reaction gears 657 and 658. The sun gears 671 and 677 are rotated with their respective bevel gears 655 and 656 causing their respective pinion gears 673 and 679 to rotate about their mounting pins which are held stationary by the carriers 673 and 682 and the hub 684. The rotation of the pinion gears 674 and 679 produces rotation of the ring gears 672 and 678. Since the sun gears 671 and 677 are rotated in opposite directions, the ring gears 672 and 678 are also rotated in opposite directions.

Rotation of the ring gear 678 and its hub extension 688 causes the cam link 618, due to the action between the cam follower 629 and the cam track 641, to move linearly. The linear movement of the cam link 618 is transmitted through the spring 632 or 633 to the valve spool 612 of the intermediate hydraulic link; thence to the servo link 615 and to servocontrol 98 to effect a change in displacement of the hydrostatic pump 59. When the rotation of the ring gears 672 and 678 is in the same direction, the displacement changes of the hydrostatic pumps 58 and 59 will be in the same direction and the speed of the hydrostatic motors 60 and 61 will be increased or decreased accordingly. When the ring gears 672 and 678 are rotated in opposite directions, the displacement changes of the hydrostatic pumps 58 and 59 will be equal but in opposite directions, for example, the displacement of hydrostatic pump 58 will increase while the displacement of hydrostatic pump 59 will decrease. The speed changes of the hydrostatic motors 60 and 61 due to the displacement of their respective hydrostatic pumps will be equal, but in opposite directions, for example, the speed of motor 60 will increase while the speed of motor 61 will decrease. Since the hydrostatic motors 60 and 61 are drivingly connected to the final drive mechanism of the vehicle, equal unidirectional changes in the output speed of the hydrostatic motors will provide an increase or decrease in the vehicle speed while opposite speed changes will produce a steer bias in the vehicle. Thus, it is seen that the ratio control actuator 34 controls the linear speed of the vehicle while the steer shaft 654 controls the steer bias or steering speed of the vehicle. Each of the ratio control actuators 34 and the steer shaft 654 can move simultaneously so that steering and linear speed control can occur simultaneously.

The pivot steer engage valve 63 includes a valve bore 695, a valve spool 696 having two equal diameter lands 697 and 698 slidably disposed in valve bore 695, and a bias spring 699 compressed between land 698 and the end of bore 695 to bias the valve spool 696 leftward in the bore 695. An inlet port 701, an outlet port 702 and a signal port 704 respectively communicate valve bore 695 with the engage exhaust passage 366, the engage passage 357, and a pivot steer apply passage 705. The pivot steer apply passage 705 is also connected to port 205 of the pivot steer valve 27 and port 152 of the neutral-automatic valve 24. When a pivot steer apply signal is present in passage 705, it is applied via port 704 to the land 697 to move the valve spool 696 rightward against the bias spring 699. The inlet and outlet ports 701 and 702 are in communication between lands 697 and 698 when the valve spool 696 is in the spring-biased position while the inlet port 701 is closed by land 697 and the outlet port 702 is open to an exhaust port 706 when the valve is shifted to permit fluid pressure to develop in the engage passage 357 and the engage control passage 528. Another exhaust port 707 prevents pressure buildup, due to leakage, between land 698 and the end of bore 695.

The vehicle is also equipped with a neutral steer system in which a neutral steer valve 711 controls the engagement and disengagement of a right brake 712 and a left brake 713. The neutral steer valve 711 includes a right bore 714 and a left bore 714a, a manual lever 715 secured to a rotatable link 716 on which is pivotally mounted a right brake actuator plunger 717 and a lift brake actuator plunger 718 which are slidably disposed in the valve bores 714 and 714a respectively. Also slidably disposed in the right bores 714 is a valve spool 721 which has two equal diameter lands 722 and 723 thereon. The left valve bore 714a has an identical valve spool 721a slidably disposed therein. Compression springs 724 and 724a are located between plunger 717 and land 722 and between plunger 718 and land 722a respectively. These springs 724 and 724a are operative to transmit a steer signal imposed by the operator on the plungers 717 and 718, through lever 715, to their respective valve spools. Two other springs 725 and 725a are held in compression between the bottom of bore 714 and lands 723 and the bottom of bore 714a and land 723a respectively. The function of release springs 725 and 725a is to urge their respective valve spools upward in their respective bores to provide fluid communication between the right brake 712 and an exhaust port 726 via the brake port 727 and the left brake 713 and an exhaust port 726a via a brake port 727a. The valve bores 714 and 714a have inlet ports 728 and 728a respectively which are connected to a neutral apply passage 729 which, in turn, is connected to a port 731 of a steer selector valve 732.

The steer selector valve 732 includes a valve bore 733, a valve spool 734 having two equal diameter lands 735 and 736, slidably disposed in valve bore 733 and a spring 737, held in compression between one end of bore 733 and land 736, to bias the valve spool 734 toward the other end of valve bore 733. Besides port 731, the steer selector valve 732 also has two signal ports 738 and 739, connected to the charge passage 93 and the passage 239 respectively, an inlet port 741, and an exhaust port 742. The inlet port 741 is connected via passage 743 to neutral main outlet port 204 of the pivot steer valve 27. The neutral main outlet port 204 is in communication between lands 194 and 195 with the neutral main inlet port 203, when the pivot steer valve 27 is in the unshifted position, as shown. The neutral main inlet port 203 is connected to a neutral main passage 744 which, in turn, is connected to the neutral main port 149 of the neutral-automatic valve 24. Thus, with the valves in the position shown, which is the neutral position, pressure in main pressure passage 66 is delivered to the neutral main passage 744 via ports 129 and 149 of the neutral-automatic valve 24, from the neutral main passage 744 to the passage 743 via ports 203 and 204 of the pivot steer valve 27, from passage 743 to neutral apply passage 729 via ports 741 and 731 of the steer selector valve 732 thereby providing fluid pressure to the ports 728 and 728a in the event that steering should become necessary when the vehicle is operating in neutral such as during towing or coasting. To effect a steer, the operator moves the lever 715, as indicated, by the arrows R and L. As the lever is moved in the direction of the arrow R, the link 716 will be rotated clockwise causing the plunger 717 to move downward in bore 714 against the spring 724. As the force in spring 724 increases, the valve spool 721 will move downward in bore 714 against the force of spring 725 so that the port 728 is open between lands 722 and 723 to port 727 which is connected to the right brake 712 thereby supplying fluid pressure to engage the brake.

To condition the transmission control for neutral operation, solenoid B is energized by the operator in any known conventional manner so that the pressure bias on land 142 and the bias of spring 136 hold the neutral automatic valve spool 134 upward in its valve bore, as shown. With the neutral automatic valve 24 in this position and the engine running so that main pump 11 is supplying pressure to the system, the pressure fluid in the main pressure passage 66 is directed between lands 144 and 145 through the neutral main passage 744 to the neutral steer valve 711, as described above. The pressure fluid in main pressure passage 66 is also directed to port 184 of the pivot steer valve 27 which is blocked by land 191 and to port 185 of the pivot steer valve 27 which is closed between lands 193 and 194.

The low pressure regulator fluid in passage 87 is communicated via passage 279 to port 229 of the push-start inhibit valve 28. When the push-start inhibit valve 28 is in the spring biased position, as shown, the pressure fluid at port 229 is communicated to port 231 between lands 219 and 221 through passage 239 and 241 where it acts on land 226 to move the plug valve 225 and the valve spool 218 downward against spring 228. As the valve spool 218 moves downward, the land 221 closes the port 231 from port 229 and simultaneously opens it at port 214 thus directing the fluid in main pressure passage 66 to port 241 to maintain the push-start inhibit valve 28 in the shifted position. Also, as valve spool 218 is moved downward, the port 215 is open to port 232 and push-start blocking passage 281 between lands 223 and 224. Thus, the pressure fluid in main pressure passage 66 is directed via passage 281 to port 277 of the push-start valve 32 where it acts on the lands 265 and 269 to cause separation between the valve spool 264 and the plug valve 268 thereby preventing a push-start mode of operation from being selected by the operator accidentally or otherwise.

During neutral operation, the ratio control valve 33 is also supplied with low-pressure regulator fluid to provide either a return signal in passage 336 or an advance signal in passage 335, as determined by throttle setting and engine speed as described above. If a return signal is present, it is directed from the ratio control valve 33 via passage 336, port 181, port 182, return passage 406 to port 399 of the directional valve 40. From the directional valve 40, the fluid may be directed to either forward return passage 385 or reverse return passage 386. If the fluid pressure is directed to forward return passage 385, it is communicated via port 382, port 377, passage 375, port 274, port 276, passage 373 and port 371 to the upper surface of the ratio control piston 361. The presence of pressure fluid on the upper surface of piston 361 will cause the piston 361 and piston rod 362 to move downward so that the reverse signal passage 367 is closed by the piston rod 362 while the forward signal passage 368 is open to exhaust by the forward exhaust groove 365. When the passage in reverse signal passage 367 is closed, the fluid flow through restriction 405 will decrease thereby permitting a pressure increase in passage 367 which is connected to port 398 of the directional valve 40. As the pressure at port 398 increases, the valve spool 392 of the directional valve 40 will move upward in its bore 391 against the spring 394 to discontinue communication between port 399 and port 388 while opening communication between port 399 and port 389. With the port 389 and its connected passage 386 open to the return passage 406, the fluid is directed via port 381a, 376a, passage 383, port 273, port 275, passage 374 and port 372 to the lower side of piston 361. With fluid pressure on the lower side of piston 361, the piston and rod will move upward in bore 359 thereby opening the reverse signal passage 367 to reverse exhaust groove 364 while closing forward signal passage 368 so that the pressure in passage 368 will increase while the pressure in passage 367 decreases. The fluid pressure in these two passages 367 and 368 is reflected upon the lands 401 and 403 of the directional valve spool 392 to cause a valve spool 392 to move downward in its bore thereby opening port 399 to port 388 while closing port 389 from port 399. Thus it is seen that any return signal present at port 399 will cause the ratio control motor 34 to seek its null or neutral position, as shown.

If an advance signal is generated by the ratio control valve 33, the signal is transmitted via advance passage 335, port 168 between lands 164 and 165 to port 169, neutral return passage 175 and port 176 of the neutral shuttle valve 26. The pressure signal at port 176 acts on the lower side of plug valve 179 thereby causing it to move upward in bore 178 so that port 176 is open to port 183 which is connected to return passage 406.

As was described above, the return passage 406 is connected to port 399 of the directional valve 40 so that any signal which is present at port 399 will cause the ratio control motor 34 to seek its neutral or null position, as shown. Thus, it is apparent that either a return or advance signal directing the neutral mode of operation will maintain the ratio control motor 34 at its neutral position. With the ratio control motor 34 at its neutral control position, the displacement of the hydrostatic pumps 58 and 59 is zero. Thus, no hydrostatic drive is available and the vehicle remains at rest. During neutral operation, the forward reverse valves 31 and the forward reverse clutch valve 35 will remain in their detented positions, as determined by a previous forward or reverse selection made at the option of the operator. Since the forward reverse valve 31 and the forward reverse clutch valve 35 are shown in the forward position, the forward clutch FWD will be energized, however no drive is transmitted to the transmission output since none of the range gearing friction-drive-establishing devices are energized.

To condition the control system for a pivot steer mode of operation, the solenoids B and C are energized by the operator. When the solenoid C is energized, the chamber surrounding spring 199 is vented by solenoid C and the restriction 201 controls the flow of pressure fluid from the low-pressure regulator passage 87 to prevent a pressure buildup in this chamber. The low-pressure regulator passage 87 is also connected to port 242 of the shift inhibitor valve 29 so that the pressure fluid in passage 87 is directed between lands 246 and 247 to port 251 and the inhibit main pressure passage 256. The inhibit main pressure passage 256 is connected to port 213 of the pivot steer valve 27 so that it directs pressure fluid to the upper side of land 195 to urge the valve spool 189 downward against spring 199. With the valve spool 189 in the shifted position, fluid pressure in main pressure passage 66 at port 185 is directed between lands 193 and 194 to port 207 and passage 211 which is connected to port 212 of the pivot steer valve 27. The pressure fluid at port 212 acting on the plug valve 196 is sufficient to hold the valve spool 189 in the shifted position against the force of spring 199. Pressure fluid in main passage 66 at port 184 is directed between lands 191 and 192 to port 205 and the pivot steer apply passage 705. The fluid pressure in pivot steer apply passage 705 is directed to the left and right range shift valves 38 and 39 via ports 152 and 148 of the neutral automatic valve 24 and range apply passage 472. Pressure fluid at the right range shift valve is directed via port 462 between lands 457 and 458 to port 464 and passage 473 which is connected to the low range friction-drive-establishing device LO to thereby engage said device thus providing a drive path in the range section of the transmission. The fluid pressure at the left range shift valve 39 is directed in a similar manner to the left low-friction-drive-establishing device LO. The pressure fluid in pivot steer apply passage 705 is also directed via port 704 of the pivot steer engage valve 63 to the left end of valve spool 696. The pressure fluid acting on the left end of valve spool 696 causes the valve spool to move rightward against spring 699 so that land 697 closes port 701 which is connected to the engage passage 357. With the port 701 closed, fluid pressure proportional to transmission input speed is developed in the engage passage 357 by the engage governor valve 57. The pressure fluid in engage passage 357 is communicated via ports 234 and 235 of the push-start inhibit valve 28 to the engage control passage 528 which is connected via ports 527 and 527a with the right and left bypass and relief valves 45 and 46.

The push-start inhibit valve 28 is shifted during a pivot steer mode of operation in the same manner in which it is shifted during the neutral mode of operation. As the input speed increases, the fluid pressure in the engage control passage 528 is developed sufficiently to cause the valve spools 513 and 513a to be moved against their bias springs 519 and 519a respectively thereby closing the ports 509 and 511 and 509a and 511a of their respective bypass and relief valves 45 and 46. With the last-mentioned ports closed, hydrostatic drive pressure will be developed when the displacement of the hydrostatic pumps 58 and 59 is changed from zero. To complete a pivot steer, the operator rotates the steer control member 694 of the ratio and steer differential control 62 thereby causing equal and opposite displacement changes in the hydrostatic pumps 58 and 59. As was described above, this will cause one drive motor to rotate forwardly while the other drive motor rotates in reverse thus causing the vehicle to rotate about its vertical axis with little or no linear movement of the vehicle.

To condition the control system for a push-start mode of operation, the operator energizes solenoids B and D. However, no fluid pressure is developed since neither the main pump or rear pump are operating. To accomplish a push-start, the vehicle is pushed or towed. As the vehicle is moved, the rear pump 12 is driven by the output tracks or wheels of the vehicle. As the speed of the vehicle increases, fluid is delivered to the control circuit by the rear pump 12 through passage 66a, check valve 88, main pressure passage 66, and low-pressure regulator passage 87. The pressure fluid in low-pressure regulator passage 87 is directed to a restriction 745 to the push-start passage 369 which is closed by the piston rod 362, as previously described, thereby permitting fluid pressure to develop in the push-start passage 369. The push-start passage 369 is connected via port 278 of the push-start valve 32 to the upper end of valve spool 264. Since the solenoid D has been energized, the chamber surrounding spring 272 is exhausted as is the passage 279 connected thereto. Since the chamber is exhausted, the fluid pressure acting on the upper end of valve spool 264 will cause the valve spool to move downward in the bore 262 thereby placing the push-start valve 32 in its shifted or activated position. With the push-start valve 32 in this position, the port 261 is open between lands 265 and 266 to port 275 which is connected via passage 374 to the lower side of piston 361 of the ratio control motor 34. Thus, the pressure fluid in the low-pressure regulator passage 87 is directed to the ratio control motor 34 to cause the piston 362 to move upward until the push-start passage 369 is slightly open to the reverse exhaust groove 364. With the passage 369 slightly opened, the pressure in passage 369 begins to decrease thereby permitting the valve spool 264 to move upward in its bore so that land 265 begins to close port 268. The pressure in passage 87 is throttled by the valve closing until only the amount of pressure necessary to maintain the ratio control motor 34 in the push-start position is present in passage 374. The movement of the ratio control motor 34 is transmitted to the ratio and steer differential control valve 62, as previously described, thereby producing equal unidirectional displacement of the hydrostatic pumps 58 and 59. Since the passage 279 is open to exhaust, the push-start inhibit valve 28 will remain in its unshifted or biased position thereby permitting pressure fluid in the main passage 66 to be delivered from port 214 to port 233, passage 238, ports 206 and 205, pivot steer apply passage 705, ports 152 and 148 and range apply passage 472 to the left and right range shift valves 39 and 38 thereby energizing the low-friction-drive-establishing devices LO, as described above for the pivot steer mode of operation. Push-start may only be accomplished in the forward drive direction. Thus, the operator must also energize solenoid E unless the transmission was operating in the forward direction at the time it stalled. The effect of operating solenoid E will be described later.

The range shift circuits are functional in push-start and the unit will upshift to intermediate in the push-start mode. The ratio control motor 34 and the ratio and steer differential control 62, in the push-start position, signal the intermediate clutch to engage. The push-start position has the hydraulic pump at zero stroke in intermediate range. Therefore, the hydrostatics provide a reaction for the mechanical drive. The forward clutch FWD is energized by the pressure fluid in passage 66, as previously described for the pivot steer mode of operation. Thus, with the intermediate-friction-drive-establishing devices INT engaged, the hydrostatic pumps at zero displacement and the forward clutch FWD engaged, a drive path between the driving wheels and the vehicle engine is available. The engage control passage 528 is connected to the main pressure passage 66 via ports 215 and 235 of the push-start inhibit valve 28 between lands 223 and 224 so that pressure fluid is available to the right and left bypass and relief valves 45 and 46 to permit drive pressure to be generated in the hydrostatic circuit. In the event that the engine should start, the engage governor valve 57 will begin operating so the pressure will be developed in the engage passage 357. When the pressure in the engage passage 357 is developed to a predetermined value, it will shift the valve spool 218 of the push-start inhibit valve 28 downward against the spring 228 thereby disconnecting main pressure passage 66 from passage 528 and connecting main pressure passage 66 to the push-start blocking passage 281, which, as described above, causes the push-start valve 32 to assume its unshifted position. Simultaneous with the disconnection of passage 66 and 528, the engage passage 357 is connected to passage 528 thereby maintaining the right and left bypass and relief valves 45 and 46 in their closed positions. After the valve spool 264 of the push-start valve 32 has assumed its unshifted position, the vehicle will continue to operate in a forward neutral mode until another mode of operation is selected by the operator.

To condition the transmission for forward or reverse drive, the operator energizes solenoid A and solenoid E or F. The following description will be given for the forward drive conditions.

When the solenoid A is energized, the chamber surrounding spring 136 of the neutral automatic valve 24 is exhausted so that pressure fluid in the low-pressure regulator passage 87 which is directed to the upper end of valve spool 134 urges the valve spool downward in its bore against the force of spring 136. With the valve spool in this position, the pressure fluid in main pressure passage 66 is directed via port 129 between lands 144 and 145 through the range apply port 147 and range apply passage 472. The range apply passage 472 directs the pressure fluid to the right and left range shift valves 38 and 39, as previously described, and to range apply port 148 of the neutral automatic valve 24. The pressure fluid at port 148 is directed between lands 143 and 144, through the automatic hold port 153, passage 156 and through port 157 where it acts on the upper end of plug valve 135 to hold the neutral-automatic valve 24 in its shifted position. Thus, if solenoid B should be energized accidentally, the neutral automatic valve 24 will remain in the shifted or automatic position until the solenoid A is deenergized. The pressure fluid at port 148 is also directed between lands 143 and 144 through the neutral hold port 151 which is connected via passage 158 and port 159 to the upper end of valve spool 163 and the neutral hold valve 25. The fluid pressure acting on the upper end of valve spool 163 urges the valve spool downward in its bore against the force of spring 167 to provide fluid communication from the advance passage 235 through port 168 between lands 165 and 166 to port 171 and a passage 746 to the advance port 303 of the forward reverse shift valve 31 while simultaneously connecting the neutral return passage 175 to the exhaust port 173. When the solenoid E is energized, the left end of valve spool 284 is exhausted while the right end of valve spool 384 is pressurized thereby urging the valve spool to the left, overcoming the detent mechanism, to place the forward reverse valve in the forward position, as shown. With the valve spool 284 in the forward position, fluid pressure in the inhibit main passage 246 is directed to the lower end of valve spool 409 of the forward-reverse clutch valve 35 via port 282, port 306, forward inhibit main passage 426 and port 424 of the forward-reverse clutch 35 while the upper end of valve spool 409 is exhausted via port 425, reverse inhibit main passage 427, port 307, and exhaust port 309 thereby placing the forward-reverse clutch valve 36 in the forward position.

The advance port 303 of the forward-reverse shift valve 31 is connected between lands 286 and 287 through forward advance port 304 and forward advance passage 387 to port 382a of the signal shuttle valve 56. The reverse advance passage 384 is open to exhaust port 308 between lands 285 and 286. Thus, any advance signal generated by the ratio control valve 33 will be directed through the neutral hold valve 25 and the forward-reverse shift valve 31 to the signal shuttle valve 56. The advance signal will cause the spool 379a to move upward in its valve bore so that port 382a is open to port 377a thereby directing the advance signal through passage 383a between lands 265 and 266 of the push-start valve 32, which is in its unshifted position, as shown, through port 275 and passage 374 to the lower side of piston 361 of the ratio control motor 34. Thus, it is seen that any advance signal in the forward direction of operation will cause the piston 361 and piston rod 362 of the ratio control motor 34 to move upward thereby causing the ratio and steer differential control 62 to change the displacement of the hydrostatic pumps 58 and 59. Any return signal which is generated by the ratio control valve 33 will be directed to the upper side of piston 361, as previously described.

With the vehicle at rest, if the operator moves the throttle control from the minimum position toward the maximum position, the speed of the engine and the ratio governor 323 if driven thereby, will increase. As the speed of the ratio governor 323 increases, the valve spool 315 will be urged leftward, as previously described, until the advance port is open to the low-pressure regulator passage 87 thereby providing an advance signal for the ratio control motor 34. The engage governor 57 also increases in speed and will develop an output pressure in engage passage 357 proportional to engine speed when the piston rod 362 has been moved sufficiently to prevent alignment between the engage exhaust passage 366 and the engage exhaust groove 363. The pressure in the engage passage 357 is directed through the push-start valve 28 to the engage control passage 528 to provide a biasing force for the right and left bypass and relief valves 45 and 46, as previously described. The push-start inhibit valve 28 is in its shifted position, as described previously, for the neutral mode of operation. The piston 361 of the ratio control motor 34 will continue to move upward in its bore until the load resistance of the drive wheels produces a decrease in engine speed so that the ratio control valve 33 assumes the position where the throttle force and ratio governor force are balanced and both the advance and return ports 333 and 322 respectively are closed by lands 317 and 316 respectively.

During the initial or low range of operation, the drive is purely hydrostatic, that is, all of the available engine power is transmitted hydraulically from the hydrostatic pumps 58 and 59 to the hydrostatic motors 60 and 61. During the intermediate and high ranges of operation, the power transmission is hydromechanical, that is, a portion of the engine power is transmitted hydraulically from the hydrostatic pumps 58 and 59 to the hydrostatic motor 60 and 61 while the remainder of power is transmitted mechanically from the engine to the drive wheels. A power transmission of this type may be seen in U.S. Pat. application Ser. No. 671,464, filed Sept. 28, 1967. During the low range of operation, the ratio and steer differential control 62 through the cam track 641 provides an increase in the displacement of the hydrostatic pumps 58 and 59. Also, during the low range of operation, the passages 444, 444a, 477 and 477a are open to their respective exhaust grooves on hub 688, as previously described. When the cam follower 629 has reached the point 747 on the cam track 641, the passages 444 and 444a will be closed so that shift signal pressure will be developed in these passages. The shift signals in passages 444 and 444a are directed to ports 438 and 438a respectively of the right and left relay valves 36 and 37 respectively. The valve spools 434 and 434a of the relay valves 36 and 37 are held upward in their respective valve bores due to the presence of forward clutch pressure in passage 428. The shift signals 444 and 444a are directed through their respective relay valves to passages 451 and 451a which are connected to the right and left range shift valves 38 and 39 respectively. As previously described, this causes the range shift valve 38 and 39 to shift from the low to intermediate position thereby disengaging the low range drive-establishing devices LO while engaging the intermediate range drive-establishing devices INT To assist in energizing the range drive-establishing devices, one or more accumulators 748 are connected to the range apply passage 472 to provide a secondary source of fluid pressure which reduces the engagement time of friction-drive-establishing devices. The fluid pressure which energizes the intermediate-friction-drive-establishing devices is also directed via passages 474 and 474a to the right and left signal valves 41 and 42 respectively and the right and left shuttle valves 43 and 44 respectively. The fluid pressure directed to the right and left signal shuttle valves is communicated to the right and left intermediate hydraulic links 501a and 501, as previously described, to produce a slight change in the displacement of the hydrostatic pumps 58 and 59. During a shift from low to intermediate, the function of the hydrostatic motors 60 and 61 changes from driving members to rotating reaction members. This change in function is accompanied by a pressure reversal in the hydrostatic drive passages 603, 604, 605 and 606. The slight change in pump displacement produced by an actuation of the hydraulic links compensate for this pressure reversal and the change in the operative function of the hydrostatic motor. The pressure fluid directed to the right and left shuttle valves is communicated via passages 508 and 508a to the inhibitor valve 29, as previously described. This presence of fluid pressure urges the valve spool 245 downward in its bore thereby disconnecting the inhibit main passage 256 from the low-pressure regulator passage 87 while connecting the inhibit main passage 256 to exhaust. Since the presence of pressure in the inhibit main passage 256 is necessary to effect a shift of the forward-reverse clutch valve 35, a shift from forward to reverse or vice versa cannot be accomplished when the range shift valves 38 and 39 are in the intermediate position. As the piston 361 moves further upward in its bore 359, the speed of the vehicle in intermediate range continues to increase until the cam follower 629 reaches the point 749 in cam track 641.

When the point 749 is reached, the passages 477 and 477a are no longer aligned with their respective exhaust groove 693 thereby permitting a signal pressure to be developed within the passages. The passages 477 and 477a direct the shift signal to ports 468 and 468a respectively of the right and left range shift valves 38 and 39 thereby causing the valve spools 455 and 455a to move from the intermediate to the high position. Simultaneous with the engagement of the high-friction-drive-establishing devices HI, the fluid pressure which energizes these friction devices is also directed via the right and left shuttle valves 43 and 44 in the signal passages 508 and 508a to the inhibit valve 29. As previously described during the intermediate operation, this prevents a forward to reverse or vice versa shift.

To steer the vehicle during forward or reverse operation, the operator merely rotates the steer control device 694 which results in equal and opposite displacement changes in the hydraulic pumps 58 and 59. During the steer maneuver, it is possible for the right half of the drive system to be operating in one range; for example, intermediate while the left half of the drive system is operating in either low or high range. It is, however, preferable that the lock-to-lock rotation of the steer control 694 is not sufficient to produce a differential between the right and left drive system such that one would be in low range while the other is in high range.

It should be understood that the foregoing disclosure relates only to a preferred embodiment of the invention for obvious modifications will occur to a person skilled in the art.

What we claim is:

1. A control, for an engine-driven hydromechanical transmission of the type having variable-displacement hydraulic pump means and hydraulic motor means operated in conjunction with mechanical gearing means, including ratio governor means for generating an advance signal and return signal in response to two engine parameters; and ratio control means operatively connected to said ratio governor means for controlling the hydraulic ratio of the pumps and motors including a pair of displacement control means for controlling the displacement of said pump means, ratio and steer differential means for controlling the displacement of said pumps in both a forward and reverse direction to provide both a drive ratio and a steer ratio, fluid actuator means for controlling a portion of said ratio and steer differential means, a pair of output means each operatively connected to one of said displacement control means, a pair of planetary gear means operatively connected between said fluid actuator means and said pair of output means for rotating said output means equal amounts in the same direction in response to movement of said fluid actuator means to establish the drive ratio in said transmission, manual steer means for controlling another portion of said ratio and steer differential means, differential gear means operatively connected between said manual steer means and said pair of output means for rotating said output means equal amounts in opposite directions in response to rotation of said manual steer means to establish the steer ratio in the transmission, and directional control means for controlling delivery of advance and return signals to said fluid actuator means; said directional control means and said fluid actuator means being operative to move said pumps to equal displacements determined by the engine parameters to provide a drive ratio, and said manual steer means being operative to move said pumps to unequal displacements to provide a steer ratio regardless of the drive ratio determined by said engine parameters.

2. The invention defined in claim 1 and said control including neutral valve means, operatively connected between said ratio governor means and said fluid actuator means, for directing the advance and return signals to hydraulically maintain the displacement of said hydraulic pump means at zero when the neutral condition is selected by said manual selector means.

3. The invention defined in claim 1 and the mechanical gearing means including planetary gear means and fluid-operated selectively engageable friction-drive-establishing means for establishing a mechanical drive ratio; said control including shift valve means for controlling the operation of said friction drive establishing means and each of said output means having shift signal means operatively connected with said shift valve means for providing shift signals thereto.

4. A transmission control, for a hydrostatic transmission providing drive and steer ratios having a pair of variable-displacement pump means, including a pair of displacement control means for controlling the displacement of said pump means; and drive and steer control means for establishing drive and steer ratio in the transmission including ratio input means, steer input means, a pair of output means each operatively connected to one of said displacement control means, a pair of planetary gear means operatively connected between said ratio input means and said pair of output means for rotating said output means equal amounts in the same direction in response to movement of said ratio input means to establish the drive ratio in said transmission, and differential gear means operatively connected between said steer input means and said pair of output means for rotating said output means equal amounts in opposite directions to establish the steer ratio in the transmission.

5. The invention defined in claim 4 and said transmission control including pressure source means for providing fluid pressure; ratio governor means, operatively connected to said source means and said ratio input means, for providing an advance and a return signal in response to a plurality of engine parameters; manual selector means operable for selecting a drive condition and a neutral condition; said ratio input means including actuator means responsive to the advance and return signals of said ratio governor means for establishing hydraulic drive ratios when said manual selector means is operated to select a drive condition; and neutral valve means, operatively connected between said ratio governor means and said actuator means, for directing the advance and return signals to hydraulically maintain the displacement of said pump means at zero when the neutral condition is selected by said manual selector means.

6. A control, for an engine-driven hydrostatic transmission having variable-displacement hydraulic pump means and hydraulic motor means operable to provide a hydraulic drive ratio, including fluid pressure source means for providing fluid pressure; ratio governor means, in fluid communication with said source means, for providing an advance and a return pressure signal in response to a plurality of engine parameters; manual selector means operable for selecting a drive condition and a neutral condition; actuator and ratio control means, operatively connected with said hydraulic pump means and in fluid communication with said ratio governor means, including piston means responsive to the advance and return signals of said ratio governor means for establishing a hydraulic drive ratio when said manual selector means is operated to select a drive condition; and neutral valve means, in fluid communication with and disposed between said ratio governor means and said actuator and ratio control means, for directing the advance and return pressure signals to hydraulically maintain the displacement of said hydraulic pump means at zero when the neutral condition is selected by said manual selector means.

7. A transmission control for a hydromechanical transmission providing drive and steer ratios having a pair of variable-displacement pump means, drive motor means and selectively engageable friction means, including a pair of displacement control means for controlling the displacement of said pump means; drive and steer control means for establishing drive and steer ratio in the transmission including ratio input means, steer input means, a pair of output means each operatively connected to one of said displacement control means and having shift signal cam means for providing shift signals, a pair of planetary gear means operatively connected between said ratio input means and said pair of output means for rotating said output means equal amounts in the same direction in response to movement of said ratio input means to establish the drive ratio in said transmission, and differential gear means operatively connected between said steer input means and said pair of output means for rotating said output means equal amounts in opposite directions to establish the steer ratio in the transmission; and shift valve means, moveable for controlling the operation of said friction means, being operatively connected to said shift signal cam means for receiving shift signals therefrom.

8. A control for an engine-driven hydromechanical transmission having variable-displacement hydraulic pump means, hydraulic motor means operable to provide a hydraulic drive ratio and gearing means having friction-drive-ratio-establishing means for providing a mechanical drive ratio, including pressure source means for providing fluid pressure; ratio governor means, in fluid communication with said source means, for providing an advance and a return signal in response to a plurality of engine parameters; manual selector means operable for selecting a drive condition and a neutral condition; actuator and ratio control means, operatively connected with said hydraulic pump means and in fluid communication with said ratio governor means, including piston means movable in response to the advance and return signals of said ratio governor means for establishing a hydraulic drive ratio when said manual selector means is operated to select a drive condition and a shift signal means responsive to movement of said piston means for controlling operation of said friction-drive-ratio-establishing means for establishing a mechanical drive ratio; and neutral valve means, in fluid communication with and disposed between said ratio governor means and said actuator and ratio control means, for directing the advance and return signals to hydraulically maintain the displacement of said hydraulic pump means at zero when the neutral condition is selected by said manual selector means.

9. A control, for a hydromechanical transmission having variable-displacement hydraulic pump means and hydraulic motor means for providing hydraulic ratios and gearing means with friction-engaging devices for providing mechanical ratios wherein the pump means supplies power to the motor means in one drive range and absorbs power from the motor means in another drive range, including displacement control means operatively connected to the pump means for controlling the displacement of the pump means; a ratio governor for providing ratio change signals; and ratio control means including actuator means operatively connected to said ratio governor and moveable in response to the ratio change signals, and displacement-compensating means operatively connected between said actuator means and said displacement control means for transmitting movement of the ratio actuator means to said displacement control means to effect changes in the displacement of said pump means in both of the ranges and having a portion moveable relative to the ratio actuator means for inducing small changes in the displacement of said pump means when the operation of the pump means is changed from one range to another range.

10. The invention defined in claim 9 and said control including shift control means operatively connected with the actuator means and the displacement-compensating means, said shift control means being moveable upon a predetermined movement of said ratio actuator means for causing movement of said portion relative to said ratio actuator means.

11. The invention defined in claim 10 and said shift control means being operatively connected with said gearing means and being moveable to cause a change in the mechanical ratio upon the same predetermined movement of said ratio actuator means.

12. A transmission control, for a hydromechanical transmission providing drive and steer ratios having a pair of variable-displacement hydraulic pump means, and hydraulic motor means for providing hydraulic drive and steer ratios and gearing means with selectively engageable friction means for providing mechanical drive ratios wherein the pump means supplies power to the motor means in one drive range and absorbs power from the motor means in another drive range, including a pair of displacement control means for controlling the displacement of the pump means; drive and steer control means for establishing drive and steer ratio in the transmission including ratio input means, steer input means, a pair of output means having shift signal cam means for providing shift signals, a pair of planetary gear means operatively connected between said ratio input means and said pair of output means for rotating said output means equal amounts in the same direction in response to movement of said ratio input means to establish the drive ratio in said transmission, differential gear means operatively connected between said steer input means and said pair of output means for rotating said output means equal amounts in opposite directions to establish the steer ratio in the transmission, and displacement-compensating means operatively connected between said output means and said displacement control means for transmitting movement of the ratio input means and the steer input means to said displacement control means to effect changes in the displacement of said pump means in both of the ranges and having a fluid-operated portion movable relative to the output means for inducing small changes in the displacement of said pump means when the operation of the pump means is changed from one range to another range; and shift valve means, movable for controlling the operation of said friction means, being operatively connected to said shift signal cam means for receiving shift signals therefrom and said shift valve means being operatively connected with said displacement-compensating means for directing fluid to said fluid-operated portion to produce movement thereof relative to said output means.

PO-1050
(5/69)

UNITED STATES PATENT OFFICE
CERTIFICATE OF CORRECTION

Patent No. __3,592,281__    Dated __July 13, 1971__

Inventor(s) __Robert C. Utter - Howard W. Christenson__

It is certified that error appears in the above-identified patent and that said Letters Patent are hereby corrected as shown below:

Column 1, line 46, "utilized" should be -- utilizes -- ;

Column 5, line 64, delete "352" and insert -- with -- ;

Column 6, line 51, delete "84" and insert -- 87 -- ;

Column 10, line 51, "special" should be -- spacial -- ;

Column 11, line 24, after 473a insert -- to -- ;
          line 36, "in" should be -- INT -- ;

Column 12, line 71, after one insert -- end -- ;

Column 15, line 65, delete "in" and insert -- is -- ;

Column 19, line 26, delete "lift" and insert -- left -- .

Signed and sealed this 18th day of July 1972.

(SEAL)
Attest:

EDWARD M. FLETCHER, JR.
Attesting Officer

ROBERT GOTTSCHALK
Commissioner of Patents